(12) United States Patent
Zhang et al.

(10) Patent No.: US 9,122,664 B2
(45) Date of Patent: Sep. 1, 2015

(54) METHOD FOR AUTOMATICALLY CREATING TRANSFORMS

(75) Inventors: Liang-Jie Zhang, Cortlandt Manor, NY (US); Jose Gomes, Douglaston, NY (US); Yi-Min Chee, Yorktown Heights, NY (US); Krishna Ratakonda, Yorktown Heights, NY (US); Fausto Bernardini, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1793 days.

(21) Appl. No.: 11/926,702

(22) Filed: Oct. 29, 2007

(65) Prior Publication Data

US 2009/0113289 A1    Apr. 30, 2009

(51) Int. Cl.
*G06F 17/00* (2006.01)
*G06F 17/22* (2006.01)
*G06F 17/21* (2006.01)

(52) U.S. Cl.
CPC .......... *G06F 17/2282* (2013.01); *G06F 17/211* (2013.01); *G06F 17/2247* (2013.01)

(58) Field of Classification Search
CPC ................................................ G06F 17/2247
USPC ........................................................ 715/239
See application file for complete search history.

(56) References Cited

U.S. PATENT DOCUMENTS

| 6,799,299 | B1* | 9/2004 | Li et al. .......................... 715/235 |
| 7,146,564 | B2* | 12/2006 | Kim et al. ...................... 715/235 |
| 7,228,497 | B2* | 6/2007 | Lander .......................... 715/234 |
| 2005/0210374 | A1* | 9/2005 | Lander .......................... 715/513 |
| 2006/0007466 | A1* | 1/2006 | Ben-Yehuda et al. ........ 358/1.13 |
| 2006/0235882 | A1* | 10/2006 | Mateescu et al. .......... 707/104.1 |
| 2007/0198968 | A1* | 8/2007 | Shenfield et al. ............. 717/104 |
| 2008/0065683 | A1* | 3/2008 | Theeten ........................ 707/102 |

* cited by examiner

*Primary Examiner* — Kavita Padmanabhan
*Assistant Examiner* — Zaida I Marrero
(74) *Attorney, Agent, or Firm* — Anne V. Dougherty; Ryan, Mason & Lewis, LLP

(57) ABSTRACT

Techniques are provided for automatically creating and using a transform to generate a document in a target format. The techniques include obtaining a source document, wherein the source document is in a structured format and wherein the source document comprises structured information from a domain-specific representation, creating a transform, wherein creating the transform comprises creating a specially-tagged version of the source document in the structured format, using a target application to create an output document in a target format with one or more corresponding tags, and applying an algorithm to automatically generate a transform, and using the transform to generate a version of the source document in a target format. Techniques are also provided for generating a database of one or more transforms.

14 Claims, 63 Drawing Sheets

FIG. 8

Service Model for Rent-a-Car

Specifically generated from the SOMA modeling environment

*Owner IBM*
*Customer*

IBM Confidential

This is a draft document produced by the GBSC/ASRD SOMA-ME Project. This document will be submitted to the IMB Asset Commercialization Board in Q4 of 2005 and once commercialized will be licensed to IBM customers. This asset may be used by IBM staff, however, customers must pay for this asset prior to using it on a customer engagement.

FIG. 22

3.1 STATIC STRUCTURE AND STATIC CONTENTS input.xml

```
<a></a>
``` output.xml

```
<o>
  <p t="The value of an attribute"/>
  <q> The contents of an entity</q>
</o>
```

Execution log

```
verbose:    accumulateTemplateMatches(<a>)
verbose:    {
verbose:        Static content nodes:
verbose:            <o> with depth 2
verbose:        nesting node = null
verbose:    }
``` a.xsl

```
<?xml version="1.0" encoding="UTF-8"?>
<xsl:stylesheet xmlns:xsl="http://www.w3.org/1999/XSL/Transform"
version="1.0"><xsl:template match="a">
<o>
  <p t="The value of an attribute"></p>
  <q>The contents of an entity</q>
</o></xsl:template>

</xsl:stylesheet>
```

FIG. 23

3.2 STATIC STRUCTURE AND DYNAMIC CONTENTS input.xml

```
<a title="Some title"
  contents="Some contents"></a>
``` output.xml

```
<o>
  <p>
    <q t="Some title"/>
    <r>Some contents</r>
  </p>
</o>
```

Execution log

```
verbose:   DynamicContentMatch
verbose:   {
verbose:       text=Some title
verbose:       inputAttributeName=title
verbose:       inputParentNode=[a: null]
verbose:       DynamicContentMatchDetailsForOutputAttributes
verbose:       {
verbose:           outputAttributeName=t
verbose:           outputParentNode=[q: null]
verbose:       }                                                    10
verbose:   }
verbose:   DynamicContentMatch
verbose:   {
verbose:       text=Some contents
verbose:       inputAttributeName=contents
verbose:       inputParentNode=[a: null]
verbose:       DynamicContentMatchDetailsForOutputTextNode
verbose:       {
verbose:           outputNode=[#text: Some contents]
verbose:       }                                                    20
verbose:   }
verbose    accumulateTemplateMatches(<a>)
verbose:   {
verbose:       Static content nodes:
verbose:           <o> with depth 2
verbose:           nesting node = null
verbose:   }
```

FIG. 23 cont.

a.xsl

```
<?xml version="1.0" encoding="UTF-8"?>
<xsl:stylesheet xmlns:xsl="http://www.w3.org/1999/XSL/Transform"
version="1.0"><xsl:template match="a">
<o>
  <p>
    <q t="{@title}"></q>
    <r><xsl:value-of select="@contents"/></r>
  </p>
</o></xsl:template>
</xsl:stylesheet>
```

FIG. 24A

3.3 DYNAMIC STRUCTURE AND NOTION OF NESTING NODE input.xml

```
<a>
  <b> battr="Some unique contents for b" />
  <c cattr="Some unique contents for c" />
  <d dattr="Some unique contents for d" />
</a>
``` output.xml

```
<o>
  <p t="Example of static contents"></p>
  <q>Other example of static contents</q>
  <r>
    <t>
      <ob a="Some unique contents for b"/>
      <oc>Some unique contents for c</oc>
      <od>
        <od2>Some unique contents for d</od2>
      </od>
    </t>
  </r>
  <s>Yet another example of static contents</s>
</o>
```
                                                                    10

Execution log

```
verbose:   DynamicContentMatch
verbose:   {
verbose:       text=Some unique contents for d
verbose:       inputAttributeName=dattr
verbose:       inputParentNode=[d: null]
verbose:       DynamicContentMatchDetailsForOutputTextNode
verbose:       {
verbose:           outputNode=[#text: Some unique contents for d]
```

*FIG. 24B*

```
verbose:    }
verbose:    }                                                              10
verbose:    DynamicContentMatch
verbose:    {
verbose:       text=Some unique contents for c
verbose:       inputAttributeName=cattr
verbose:       inputParentNode=[c: null]
verbose:       DynamicContentMatchDetailsForOutputTextNode
verbose:       {
verbose:          outputNode=[#text: Some unique contents for c]
verbose:       }
verbose:    }                                                              20
verbose:    DynamicContentMatch
verbose:    {
verbose:       text=Some unique contents for b
verbose:       inputAttributeName=battr
verbose:       inputParentNode=[b: null]
verbose:       DynamicContentMatchDetailsForOutputAttributes
verbose:    {
verbose:          outputAttributeName=a
verbose:          outputParentNode=[ob: null]
verbose:       }                                                           30
verbose: }
verbose  accumulateTemplateMatches(<a>)
verbose:    {
verbose:       Static content nodes:
verbose:          <o> with depth 2
verbose:       nesting node = <t> with depth 4
verbose:       nesting node has following children:
verbose:          <t>
verbose:             TEXT_NODE(...)
verbose:             <ob> (ancestor of <b>)                                40
verbose:             TEXT_NODE(...)
verbose:             <oc> (ancestor of <c>)
verbose:             TEXT_NODE(...)
verbose:             <od> (ancestor of <d>)
verbose:             TEXT_NODE(...)
```

FIG. 24B cont

```
verbose:        This nesting node has a depth greater than or equal
                to the static content nodes of this template (nested
verbose:    }
verbose:    accumulateTemplateMatches(<b>)
verbose:    {
verbose:        Static content nodes:
verbose:            <ob> with depth 5
verbose:        nesting node = null
verbose:    }                                                          50
verbose:    accumulateTemplateMatches(<c>)
verbose:    {
verbose:        Static content nodes:
verbose:            <oc> with depth 5
verbose:        nesting node = null
verbose:    }
verbose:    accumulateTemplateMatches(<d>)                             60
verbose:    {
verbose:        Static content nodes:
verbose:            <od> with depth 5
verbose:        nesting node = null
verbose:    }
```

FIG. 24C a.xsl

```
<?xml version="1.0" encoding="UTF-8"?>
<xsl:stylesheet xmlns:xsl="http://www.w3.org/1999/XSL/Transform" version="1.0"><xsl:import href="b.xsl"/>
<xsl:import href="c.xsl"/>
<xsl:import href="d.xsl"/>
<xsl:template match="a">
<o>
  <p t="Example of static contents"></p>
  <q>Other example of static contents</q>
  <r>
    <t>
    <xsl:apply-templates select="b/c/d"/>

</t>
  </r>
  <s>Yet another example of static contents</s>
</o><xsl:template>
</xsl:stylesheet>
``` b.xsl

```
<?xml version="1.0" encoding="UTF-8"?>
<xsl:stylesheet xmlns:xsl="http://www.w3.org/1999/XSL/Transform" version="1.0"><xsl:template match="b">
<ob a="{@battr}"></ob></xsl:template>
</xsl:stylesheet>
``` c.xsl

```
<?xml version="1.0" encoding="UTF-8"?>
<xsl:stylesheet xmlns:xsl="http://www.w3.org/1999/XSL/Transform" version="1.0"><xsl:template match="c">
<oc><xsl:value-of select="@cattr"/></oc></xsl:template>
</xsl:stylesheet>
``` d.xsl

```
<?xml version="1.0" encoding="UTF-8"?>
<xsl:stylesheet xmlns:xsl="http://www.w3.org/1999/XSL/Transform" version="1.0"><xsl:template match="d">
<od>
  <od2><xsl:value-of select="@dattr"/></od2>
  </od></xsl:template>
</xsl:stylesheet>
```

*FIG. 25A*

3.4 NESTED DYNAMIC STRUCTURE

Used for instance in WordML where < section >, < subsection >, etc... are nested.

input.xml

```
<a>
  <a1 a1attr="Some unique contents for a1"
          a2attr="Some other unique contents for a1">
    <a11 a11attr="Some unique contents for a11">
      <a111 a111attr="Some unique contents for a111"/>
      <a112 a112attr="Some unique contents for a112"/>
    </a11>
    <a12 a12attr="Some unique contents for a12"/>
  </a1>
  <a2 a2attr="Some unique contents for a2"
          a2attr2="Some other unique contents for a2"/>
</a>
``` output.xml

```
<o>
  <o1>
    <o1header>Some unique contents for a1</o1header>
    <o11>
      <o111>Some unique contents for a111</o111>
      <o111>Some unique contents for a112</o111>
      <o11footer>Some unique contents for a11</o11footer>
    </o11>
    <o11>
      <o11footer>Some unique contents for a12</o11footer>
    </o11>
    <o1footer>Some other unique contents for a1</o1footer>
  </o1>
  <o1>
    <o1header>Some unique contents for a2</o1header>
    <o1footer>Some other unique contents for a2</o1footer>
  </o1>
</o>
```

*FIG. 25A cont.*

Execution log

```
verbose:   DynamicContentMatch
verbose:   {
verbose:     text=Some unique contents for a11
verbose:     inputAttributeName=a11attr
verbose:     inputParentNode=[a11:null]
verbose:     DynamicContentMatchDetailsForOutputTextNode
verbose:     {
verbose:       outputNode=[#text: Some unique contents for a11]
```

*FIG. 25B*

```
verbose:    }
verbose:    }                                                           10
verbose:    DynamicContentMatch
verbose:    {
verbose:       text=Some unique contents for a2
verbose:       inputAttributeName=a2attr
verbose:       inputParentNode=[a2: null]
verbose:       DynamicContentMatchDetailsForOutputTextNode
verbose:       {
verbose:          outputNode=[#text: Some unique contents for a2]
verbose:       }
verbose:    }                                                           20
verbose:    DynamicContentMatch
verbose:    {
verbose:       text=Some other unique contents for a1
verbose:       inputAttributeName=a2attr
verbose:       inputParentNode=[a1: null]
verbose:       DynamicContentMatchDetailsForOutputTextNode
verbose:       {
verbose:          outputNode=[#text: Some other unique contents for a1]
verbose:       }
verbose:    }                                                           30
verbose:    DynamicContentMatch
verbose:    {
verbose:       text=Some unique contents for a12
verbose:       inputAttributeName=a12attr
verbose:       inputParentNode=[a12: null]
verbose:       DynamicContentMatchDetailsForOutputTextNode
verbose:       {
verbose:          outputNode=[#text: Some unique contents for a12]
verbose:       }
verbose:    }                                                           40
verbose:    DynamicContentMatch
verbose:    {
verbose:       text=Some unique contents for a112
verbose:       inputAttributeName=a112attr
verbose:       inputParentNode=[a112: null]
verbose:       DynamicContentMatchDetailsForOutputTextNode
verbose:       {
verbose:          outputNode=[#text: Some unique contents for a112]
verbose:       }
verbose:    }                                                           50
```

*FIG. 25B cont.*

```
verbose:  DynamicContentMatch
verbose:  {
verbose:     text=Some unique contents for a1
verbose:     inputAttributeName=a1attr
verbose:     inputParentNode=[a1: null]
verbose:     DynamicContentMatchDetailsForOutputTextNode
verbose:     {
verbose:        outputNode=[#text: Some unique contents for a1]
verbose:     }
verbose:  }                                                          60
verbose:  DynamicContentMatch
verbose:  {
verbose:     text=Some unique contents for a111
verbose:     inputAttributeName=a111attr
verbose:     inputParentNode=[a111: null]
```

FIG. 25C

```
verbose:    DynamicContentMatchDetailsForOutputTextNode
verbose:    {
verbose:        outputNode=[#text: Some unique contents for a111]
verbose:    }
verbose:  }                                                              70
verbose:  DynamicContentMatch
verbose:  {
verbose:     text=Some other unique contents for a2
verbose:     inputAttributeName=a2attr2
verbose:     inputParentNode=[a2: null]
verbose:     DynamicContentMatchDetailsForOutputTextNode
verbose:     {
verbose:        outputNode=[#text: Some unique contents for a2]
verbose:     }
verbose: }                                                               80
verbose   accumulateTemplateMatches(<a>)
verbose:  {
verbose:     Static content nodes:
verbose:        <o> with depth 2
verbose:     nesting node = <o> with depth 2
verbose:     nesting node has following children:
verbose:        <o>
verbose:           TEXT_NODE(...)
verbose:           <o1> (ancestor of <a1>)
verbose:           TEXT_NODE(...)                                        90
verbose:           <o1> (ancestor of <a2>)
verbose:           TEXT_NODE(...)
```

FIG. 25C cont.

```
verbose:     This nesting node has a depth greater than or equal
             to the static content nodes of this template (nested
verbose:     }
verbose:     accumulateTemplateMatches(<a1>)
verbose:     {
verbose:         Static content nodes:
verbose:             <o1> with depth 3
verbose:         nesting node = <o1> with depth 3
verbose:         nesting node has following children:                          100
verbose:             <o1>
verbose:                 TEXT_NODE(...)
verbose:                 <o1header>
verbose:                 TEXT_NODE(...)
verbose:                 <o11> (ancestor of <a11>)
verbose:                 TEXT_NODE(...)
verbose:                 <o11> (ancestor of <a12>)
verbose:                 TEXT_NODE(...)
verbose:                 <o1footer>
verbose:                 TEXT_NODE(...)                                        110
verbose:         This nesting node has a depth greater than or equal
                 to the static content nodes of this template (nested
verbose:     }
verbose:     accumulateTemplateMatches(<a11>)
verbose:     {
verbose:         Static content nodes:
verbose:             <o11> with depth 4
verbose:         nesting node = <o11> with depth 4
verbose:         nesting node has following children:
verbose:             <o11>
verbose:                 TEXT_NODE(...)                                        120
verbose:                 <o111> (ancestor of <a111>)
verbose:                 TEXT_NODE(...)
```

FIG. 25D

```
verbose:        <o111> (ancestor of <a112>)
verbose:        TEXT_NODE(...)
verbose:        <o11footer>
verbose:        TEXT_NODE(...)
verbose:        This nesting node has a depth greater than or equal
                to the static content nodes of this template (nested
verbose:   }
verbose:   accumulateTemplateMatches(<a111>)
verbose:   {                                                         130
verbose:        Static content nodes:
verbose:            <o111> with depth 5
verbose:        nesting node = null
verbose:   }
verbose:   accumulateTemplate Matches(<a112>)
verbose:   {
verbose:        Static content nodes:
verbose:            <o111> with depth 5
verbose:        nesting node = null
verbose:   }                                                         140
verbose:   accumulateTemplate Matches(<a12>)
verbose:   {
verbose:        Static content nodes:
verbose:            <o11> with depth 4
verbose:        nesting node = null
verbose:   }
verbose:   accumulateTemplate Matches(<a2>)
verbose:   {
verbose:        Static content nodes:
verbose:            <o1> with depth 3                                150
verbose:        nesting node = null
verbose:   }
```

FIG. 25D cont.

a.xsl

```
<?xml version="1.0" encoding="UTF-8"?>
<xsl:stylesheet xmlns:xsl="http://www.w3.org/1999/XSL/Transform" version=
"1.0"><xsl:import href="a1.xsl"/>
<xsl:import href="a2.xsl"/>
<xsl:template match="a">
<o>
<xsl:apply-templates select="a1/a2"/>

</o></xsl:template>
<xsl:stylesheet>
```
10 a1.xsl

```
<?xml version="1.0" encoding="UTF-8"?>
<xsl:stylesheet xmlns:xsl="http://www.w3.org/1999/XSL/Transform" version=
"1.0"><xsl:import href="a11.xsl"/>
<xsl:import href="a12.xsl"/>
<xsl:template match="a1">
<o1>
    <o1header><xsl:value-of select="@a1attr"/></o1header>
    <xsl:apply-templates select="a11/a12"/>
```

FIG. 25E

```
    <o1footer><xsl:value-of select="@a2attr"/></o1footer>         10
  </o1></xsl:template>
</xsl:stylesheet>
``` a11.xsl

```
<?xml version="1.0" encoding="UTF-8"?>
<xsl:stylesheet xmlns:xsl="http://www.w3.org/1999/XSL/Transform" version=
"1.0"><xsl:import href="a111.xsl"/>
<xsl:import href="a112.xsl"/>
<xsl:template match="a11">
<o11>
    <xsl:apply-templates select="a111/a112"/>

<o11footer><xsl:value-of select="@a11attr"/></o11footer>
  </o11></xsl:template>                                           10
</xsl:stylesheet>
``` a111.xsl

```
<?xml version="1.0" encoding="UTF-8"?>
<xsl:stylesheet xmlns:xsl="http://www.w3.org/1999/XSL/Transform" version=
"1.0"><xsl:template match="a111">
<o111><xsl:value-of select="@a111attr"/></o111></xsl:template>
</xsl:stylesheet>
```

FIG. 26A

3.5 SEQUENTIAL DYNAMIC STRUCTURE (without index)

Used for instance in HTML where < h1 >, < h2 >, etc... are nested.

input.xml

```
<a>
  <a1 a1attr="Some unique contents for a1"
          a2attr="Some other unique contents for a1">
    <a11 a11attr="Some unique contents for a11">
      <a111 a111attr="Some unique contents for a111"/>
      <a112 a112attr="Some unique contents for a112"/>
    </a11>
    <a12 a12attr="Some unique contents for a12"/>
  </a1>
  <a2 a2attr="Some unique contents for a2"
          a2attr2="Some other unique contents for a2"/>
</a>
```

```
output.xml

<o>
  <o1>
    <o1header>Some unique contents for a1</o1header>
    <o1footer>Some other unique contents for a1</o1footer>
  </o1>
  <o11>
    <o11footer>Some unique contents for a11</o11footer>
  </o11>
  <o11>
    <o11footer>Some unique contents for a12</o11footer>          10
  </o11>
  <o111>Some unique contents for a111</o111>
  <o111>Some unique contents for a112</o111>
  <o1>
    <o1header>Some unique contents for a2</o1header>
    <o1footer>Some other unique contents for a2</o1footer>
  </o1>
</o>
```

FIG. 26B cont.

Execution log

```
verbose:    DynamicContentMatch
verbose:    {
verbose:        text=Some unique contents for a11
verbose:        inputAttributeName=a11attr
verbose:        inputParentNode=[a11: null]
verbose:        DynamicContentMatchDetailsForOutputTextNode
verbose:        {
verbose:            outputNode=[#text: Some unique contents for a11]
verbose:        }
verbose:    }                                                              10
verbose:    DynamicContentMatch
verbose:    {
verbose:        text=Some unique contents for a2
verbose:        inputAttributeName=a2attr
verbose:        inputParentNode=[a2: null]
verbose:        DynamicContentMatchDetailsForOutputTextNode
verbose:        {
verbose:            outputNode=[#text: Some unique contents for a2]
verbose:        }
verbose:    }                                                              20
verbose:    DynamicContentMatch
verbose:    {
verbose:        text=Some other unique contents for a1
verbose:        inputAttributeName=a2attr
verbose:        inputParentNode=[a1: null]
verbose:        DynamicContentMatchDetailsForOutputTextNode
verbose:        {
verbose:            outputNode=[#text: Some other unique contents for a1]
verbose:        }
verbose:    }                                                              30
verbose:    DynamicContentMatch
verbose:    {
```

FIG. 26C

```
verbose:     text=Some unique contents for a12
verbose:     inputAttributeName=a12attr
verbose:     inputParentNode=[a12: null]
verbose:     DynamicContentMatchDetailsForOutputTextNode
verbose:     {
verbose:          outputNode=[#text: Some unique contents for a12]
verbose:     }
verbose: }                                                                40
verbose: DynamicContentMatch
verbose: {
verbose:     text=Some unique contents for a112
verbose:     inputAttributeName=a112attr
verbose:     inputParentNode=[a112: null]
verbose:     DynamicContentMatchDetailsForOutputTextNode
verbose:     {
verbose:          outputNode=[#text: Some unique contents for a112]
verbose:     }
verbose: }                                                                50
verbose: DynamicContentMatch
verbose: {
verbose:     text=Some unique contents for a1
verbose:     inputAttributeName=a1attr
verbose:     inputParentNode=[a1: null]
verbose:     DynamicContentMatchDetailsForOutputTextNode
verbose:     {
verbose:          outputNode=[#text: Some unique contents for a1]
verbose:     }                                                            60
verbose: }
verbose: DynamicContentMatch
verbose: {
verbose:     text=Some unique contents for a111
verbose:     inputAttributeName=a111attr
verbose:     inputParentNode=[a111: null]
verbose:     DynamicContentMatchDetailsForOutputTextNode
verbose:     {
verbose:          outputNode=[#text: Some unique contents for a111]
verbose:     }
verbose: }                                                                70
```

FIG. 26C cont.

```
verbose:   DynamicContentMatch
verbose:   {
verbose:       text=Some other unique contents for a2
verbose:       inputAttributeName=a2attr2
verbose:       inputParentNode=[a2: null]
verbose:       DynamicContentMatchDetailsForOutputTextNode
verbose:       {
verbose:           outputNode=[#text: Some other unique contents for a2]
verbose:       }
verbose:   }                                                                    80
verbose:       accumulateTemplateMatches(<a>)
verbose:       {
verbose:           Static content nodes:
verbose:               <o> with depth 2
verbose:           nesting node = <o> with depth 2
verbose:           nesting node has following children:
verbose:               <o>
verbose:                   TEXT_NODE(...)
verbose:                   <o1> (ancestor of <a1>)
```

FIG. 26D

```
verbose:                TEXT_NODE(...)                                    90
verbose:                <o11>
verbose:                TEXT_NODE(...)
verbose:                <o11>
verbose:                TEXT_NODE(...)
verbose:                <o111>
verbose:                TEXT_NODE(...)
verbose:                <o111>
verbose:                TEXT_NODE(...)
verbose:                <o1> (ancestor of <a2>)
verbose:                TEXT_NODE(...)                                    100
verbose:        This nesting node has a depth greater than or equal
                to the static content nodes of this template (nested
verbose:    }
verbose:    accumulateTemplateMatches(<a1>)
verbose:    {
verbose:        Static content nodes:
verbose:            <o1> with depth 3
verbose:        nesting node = <o> with depth 2
verbose:        nesting node has following children:
verbose:            <o>
verbose:                TEXT_NODE(...)                                    110
verbose:                <o1>
verbose:                TEXT_NODE(...)
verbose:                <o11>
verbose:                TEXT_NODE(...)
verbose:                <o11>
verbose:                TEXT_NODE(...)
verbose:                <o111>
verbose:                TEXT_NODE(...)
verbose:                <o111>
verbose:                TEXT_NODE(...)                                    120
verbose:                <o1>
verbose:                TEXT_NODE(...)
verbose:        This nesting node has a depth lesser than the static
                content nodes of this template (sequential pattern)
verbose:    }
verbose:    accumulateTemplateMatches(<a11>)
verbose:    {
```

FIG. 26D cont.

```
verbose:      Static content nodes:
verbose:          <o11> with depth 3
verbose:      nesting node = <o> with depth 2
verbose:      nesting node has following children:              130
verbose:          <o>
verbose:              TEXT_NODE(...)
verbose:          <o1>
verbose:              TEXT_NODE(...)
verbose:          <o11>
verbose:              TEXT_NODE(...)
verbose:          <o11>
verbose:              TEXT_NODE(...)
verbose:          <o111>
verbose:              TEXT_NODE(...)                            140
verbose:          <o111>
verbose:              TEXT_NODE(...)
verbose:          <o1>
verbose:              TEXT_NODE(...)
verbose:      This nesting node has a depth lesser than the static
              content nodes of this template (sequential pattern)
verbose:  }
```

FIG. 26E

```
verbose:  accumulateTemplateMatches(<a111>)
verbose:  {
verbose:        Static content nodes:
verbose:            <o111>with depth 3                              150
verbose:        nesting node = null
verbose:  }
verbose:  accumulateTemplateMatches(<a112>)
verbose:  {
verbose:        Static content nodes:
verbose:            <o111> with depth 3
verbose:        nesting node = null
verbose:  }
verbose:  accumulateTemplateMatches(<a12>)
verbose:  {                                                         160
verbose:        Static content nodes:
verbose:            <o11> with depth 3
verbose:        nesting node = null
verbose:  }
verbose:  accumulateTemplateMatches(<a2>)
verbose:  {
verbose:        Static content nodes:
verbose:            <o1> with depth 3
verbose:        nesting node = null
verbose:  }                                                         170
```

*FIG. 26E cont.* a.xsl

```
<?xml version="1.0" encoding="UTF-8"?>
<xsl:stylesheet xmlns:xsl="http://www.w3.org/1999/XSL/Transform" version="1.0"<xsl:import href="a1.xsl"/>
<xsl:import href="a2.xsl"/>
<xsl:template match="a">
<o>
   <xsl:apply-templates select="a2/a1"/>

</o></xsl:template>
</xsl:stylesheet>
```

10 a1.xsl

```
<?xml version="1.0" encoding="UTF-8"?>
<xsl:stylesheet xmlns:xsl="http://www.w3.org/1999/XSL/Transform" version="1.0"><xsl:import href="a11.xsl"/>
<xsl:import href="a12.xsl"/>
<xsl:template match="a1">
<o1>
    <o1header><xsl:value-of select="@a1attr"/></o1header>
    <o1footer><xsl:value-of select="@a2attr"/></o1footer>
  </o1><xsl:apply-templates select="a11/a12"/>
</xsl:template>
```

FIG. 26F

```
</xsl:stylesheet>                                                    10 a11.xsl

<?xml version="1.0" encoding="UTF-8"?>
<xsl:stylesheet xmlns:xsl="http://www.w3.org/1999/XSL/Transform" version=
"1.0"><xsl:import href="a111.xsl"/>
<xsl:import href="a112.xsl"/>
<xsl:template match="a11">
<o11>
    <o11footer><xsl:value-of select="@a11attr"/></o11footer>
   <o11><xsl:apply-templates select="a112/a111"/>
<xsl:template>
</xsl:stylesheet> a111.xsl

<?xml version="1.0" encoding="UTF-8"?>
<xsl:stylesheet xmlns:xsl="http://www.w3.org/1999/XSL/Transform" version=
"1.0"><xsl:template match="a111">
<o111><xsl:value-of select="@a111attr"/></xsl:template>
</xsl:stylesheet>
```

FIG. 27A

3.6 MIXED DYNAMIC STRUCTURE

Used in WordML.

input.xml

```
<a>
  <a1 a1attr="Some unique contents for a1"
         a2attr="Some other unique contents for a1">
    <a11 a11attr="Some unique contents for a11">
      <a111 a111attr="Some unique contents for a111"/>
      <a112 a112attr="Some unique contents for a112"/>
    </a11>
    <a12 a12attr="Some unique contents for a12"/>
  </a1>
  <a2 a2attr="Some unique contents for a2"                           10
         a2attr2="Some other unique contents for a2"/>
</a>
``` output.xml

```
<o>
  <o1>
    <o1header>Some unique contents for a1</o1header>
    <o1footer>Some unique contents for a1</o1footer>
  </o1>
```

*FIG. 27B*

```
<o11>
  <o111>Some unique contents for a111</o111>
  <o111>Some unique contents for a112</o111>
  <o11footer>Some unique contents for a11</o11footer>
</o11>                                                              10
<o11>
  <o11footer>Some unique contents for a12</o11footer>
</o11>
<o1>
  <o1header>Some unique contents for a2</o1header>
  <o1footer>Some other unique contents for a2</o1footer>
</o1>
</o>
```

Execution log

```
verbose: DynamicContentMatch
verbose: {
verbose:     text=Some unique contents for a11
verbose:     inputAttributeName=a11attr
verbose:     inputParentNode=[a11: null]
verbose:     DynamicContentMatchDetailsForOutputTextNode
verbose:     {
verbose:         outputNode=[#text: Some unique contents for a11]
verbose:     }
verbose: }                                                          10
verbose: DynamicContentMatch
verbose: {
verbose:     text=Some unique contents for a2
verbose:     inputAttributeName=a2attr
verbose:     inputParentNode=[a2: null]
verbose:     DynamicContentMatchDetailsForOutputTextNode
verbose:     {
verbose:         outputNode=[#text: Some unique contents for a2]
verbose:     }                                                      20
verbose: }
verbose: DynamicContentMatch
verbose: {
verbose:     text=Some unique contents for a1
verbose:     inputAttributeName=a2attr
verbose:     inputParentNode=[a1: null]
verbose:     DynamicContentMatchDetailsForOutputTextNode
verbose:     {
```

FIG. 27B cont.

```
verbose:         outputNode=[#text: Some unique contents for a1]
verbose:      }
verbose:   }
verbose:   DynamicContentMatch
verbose:   {
verbose:      text=Some unique contents for a12
verbose:      inputAttributeName=a12attr
verbose:      inputParentNode=[a12: null]
verbose:      DynamicContentMatchDetailsForOutputTextNode
verbose:      {
verbose:         outputNode=[#text: Some unique contents for a12]
verbose:      }
```

```
verbose:    }                                                                    40
verbose:    DynamicContentMatch
verbose:    {
verbose:       text=Some unique contents for a112
verbose:       inputAttributeName=a112attr
verbose:       inputParentNode=[a112: null]
verbose:       DynamicContentMatchDetailsForOutputTextNode
verbose:       {
verbose:           outputNode=[#text: Some unique contents for a112]
verbose:       }                                                                 50
verbose:    }
verbose:    DynamicContentMatch
verbose:    {
verbose:       text=Some unique contents for a1
verbose:       inputAttributeName=a1attr
verbose:       inputParentNode=[a1: null]
verbose:       DynamicContentMatchDetailsForOutputTextNode
verbose:       {
verbose:           outputNode=[#text: Some unique contents for a1]
verbose:       }
verbose:    }                                                                    60
verbose:    DynamicContentMatch
verbose:    {
verbose:       text=Some unique contents for a111
verbose:       inputAttributeName=a111attr
verbose:       inputParentNode=[a111: null]
verbose:       DynamicContentMatchDetailsForOutputTextNode
verbose:       {
verbose:           outputNode=[#text: Some unique contents for a111]
verbose:       }                                                                 70
verbose:    }
verbose:    DynamicContentMatch
verbose:    {
verbose:       text=Some other unique contents for a2
verbose:       inputAttributeName=a2attr2
verbose:       inputParentNode=[a2: null]
verbose:       DynamicContentMatchDetailsForOutputTextNode
verbose:       {
verbose:           outputNode=[#text: Some unique contents for a2]
verbose:       }
verbose:    }                                                                    80
```

*FIG. 27C cont.*

```
verbose:    accumulateTemplateMatches(<a>)
verbose:    }
verbose:        Static content nodes:
verbose:            <o> with depth 2
verbose:            nesting node = <o> with depth 2
verbose:            nesting node has following children:
verbose:                <o>
verbose:                    TEXT_NODE(...)
verbose:                    <o1> (ancestor of <a1>)                90
verbose:                    TEXT_NODE(...)
verbose:                    <o11>
verbose:                    TEXT_NODE(...)
verbose:                    <o11>
verbose:                    TEXT_NODE(...)
verbose:                    <o1> (ancestor of <a2>)
verbose:                    TEXT_NODE(...)
```

*FIG. 27D*

```
verbose:        This nesting node has a depth greater than or equal
                to the static content nodes of this template (nested
verbose:    }
verbose:    accumulateTemplateMatches(<a1>)
verbose:    {                                                                100
verbose:        Static content nodes:
verbose:            <o1> with depth 3
verbose:        nesting node = <o> with depth 2
verbose:        nesting node has following children:
verbose:            <o>
verbose:                TEXT_NODE(...)
verbose:            <o1>
verbose:                TEXT_NODE(...)
verbose:            <o11>
verbose:                TEXT_NODE(...)                                       110
verbose:            <o11>
verbose:                TEXT_NODE(...)
verbose:            <o1>
verbose:                TEXT_NODE(...)
verbose:        This nesting node has a depth lesser than the static
                content nodes of this template (sequential pattern)
verbose:    }
verbose:    accumulateTemplateMatches(<a11>)
verbose:    {
verbose:        Static content nodes:
verbose:            <o11> with depth 3                                       120
verbose:        nesting node = <o11> with depth 3
verbose:        nesting node has following children:
verbose:            <o11>
verbose:                TEXT_NODE(...)
verbose:                <o111> (ancestor of <a111>)
verbose:                TEXT_NODE(...)
verbose:                <o111> (ancestor of <a112>)
verbose:                TEXT_NODE(...)
verbose:                <o11footer>
verbose:                TEXT_NODE(...)                                       130
verbose:        This nesting node has a depth greater than or equal
                to the static content nodes of this template (nested
verbose:    }
verbose:    accumulateTemplateMatches(<a111>)
verbose:    {
```

*FIG. 27D cont.*

```
verbose:        Static content nodes:
verbose:            <o111> with depth 4
verbose:            nesting node = null
verbose:        }
verbose:    accumulateTemplateMatches(<a112>)
verbose:    {                                                              140
verbose:        Static content nodes:
verbose:            <o111> with depth 4
verbose:            nesting node = null
verbose:        }
verbose:    accumulateTemplateMatches(<a12>)
verbose:    {
verbose:        Static content nodes:
verbose:            <o11> with depth 3
verbose:            nesting node = null
verbose:    }                                                              150
verbose:    accumulateTemplateMatches(<a2>)
verbose:    {
verbose:        Static content nodes:
```

FIG. 27E

```
verbose:          <o1> with depth 3
verbose:        nesting node = null
verbose: }
``` a.xsl

```
<?xml version="1.0" encoding="UTF-8"?>
<xsl:stylesheet xmlns:xsl="http://www.w3.org/1999/XSL/Transform" version=
"1.0"><xsl:import href="a1.xsl"/>
<xsl:import href="a2.xsl"/>
<xsl:template match="a">
<o>
   <xsl:apply-templates select="a1/a2"/>

</o></xsl:template>
</xsl:stylesheet>
```
10 a1.xsl

```
<?xml version="1.0" encoding="UTF-8"?>
<xsl:stylesheet xmlns:xsl="http://www.w3.org/1999/XSL/Transform" version=
"1.0"><xsl:import href="a11.xsl"/>
<xsl:import href="a12.xsl"/>
<xsl:template match="a1">
<o1>
    <o1header><xsl:value-of select="@a1attr"/></o1header>
    <o1footer><xsl:value-of select="@a2attr"/></o1footer>
  </o1><xsl:spply-templates select="a11/a12"/>
</xsl:template>
</xsl:stylesheet>
```
10 a11.xsl

```
<?xml version="1.0" encoding="UTF-8"?>
<xsl:stylesheet xmlns:xsl="http://www.w3.org/1999/XSL/Transform" version=
"1.0"><xsl:import href="a111.xsl"/>
<xsl:import href="a112.xsl"/>
<xsl:template match="a11">
<o11>
   <xsl:apply-templates select="a111/a112"/>
```

*FIG. 27E cont.*

```
  <o11footer><xsl:value-of select="@a11attr"/></o11footer>
</o11></xsl:template>
</xsl:stylesheet>
```
10 a111.xsl

```
<?xml version="1.0" encoding="UTF-8"?>
<xsl:stylesheet xmlns:xsl="http://www.w3.org/1999/XSL/Transform" version="1.0"><xsl:template match="a111">
<o111><xsl:value-of select="@a111attr"/></o111></xsl:template>
</xsl:stylesheet>
```

FIG. 28A

4.1 SEQUENTIAL DYNAMIC STRUCTURE (with index)

Used for instance in Excel. Each sequenced item in the output has an associated counter that is incremented. The current code ignores this and outputs a considers the counter value as a regular static contents. Below are two equivalent examples of this situation. Handling this pattern will require introducing a magic keyword (e.g. < *AutoXSLT* : *counter* >) in the input document or passing a special argument to a new command line option of AutoXSLT.

4.1.1 EXAMPLE 1 input.xml

```
<a>
   <b battr="Some unique contents for first b"/>
   <b battr="Some unique contents for second b"/>
   <b battr="Some unique contents for third b"/>
</a>
``` output.xml

```
<o>
   <p n="0" x="Some unique contents for first b"/>
   <p n="1" x="Some unique contents for second b"/>
   <p n="2" x="Some unique contents for third b"/>
</o>
```

FIG. 28B

```
Execution log verbose:   DynamicContentMatch
verbose:   {
verbose:       text=Some unique contents for third b
verbose:       inputAttributeName=battr
verbose:       inputParentNode=[b: null]
verbose:       DynamicContentMatchDetailsForOutputAttributes
verbose:       {
verbose:           outputAttributeName=x
verbose:           outputParentNode=[p: null]
verbose:       }                                                    10
verbose:   }
verbose:   DynamicContentMatch
verbose:   {
verbose:       text=Some unique contents for second b
verbose:       inputAttributeName=battr
verbose:       inputParentNode=[b: null]
verbose:       DynamicContentMatchDetailsForOutputAttributes
verbose:       {
verbose:           outputAttributeName=x
verbose:           outputParentNode=[p: null]                        20
verbose:       }
verbose:   }
verbose:   DynamicContentMatch
verbose:   {
verbose:       text=Some unique contents for first b
verbose:       inputAttributeName=battr
verbose:       inputParentNode=[b: null]
verbose:       DynamicContentMatchDetailsForOutputAttributes
verbose:       {
verbose:           outputAttributeName=x                             30
verbose:           outputParentNode=[p: null]
verbose:       }
verbose:   }
verbose:       accumulateTemplateMatches(<a>)
verbose:       {
verbose:           Static content nodes:
verbose:               <o> with depth 2
verbose:           nesting node = <o> with depth 2
```

FIG. 28B cont.

```
verbose:        nesting node has following children:                    40
verbose:            <o>
verbose:                TEXT_NODE(...)
verbose:                <p> (ancestor of <b>)
verbose:                TEXT_NODE(...)
verbose:                <p> (ancestor of <b>)
verbose:                TEXT_NODE(...)
verbose:                <p> (ancestor of <b>)
verbose:                TEXT_NODE(...)
verbose:        This nesting node has a depth greater than or equal
                to the static content nodes of this template (nested
verbose:    }
verbose:    accumulateTemplateMatches(<b>)                              50
verbose:    {
verbose:        Static content nodes:
verbose:            <p> with depth 3
verbose:        nesting node = null
verbose:    }
```

FIG. 28C

```
verbose:    accumulateTemplateMatches(<b>)
verbose:    {
verbose:        Static content nodes:
verbose:            <p> with depth 3
verbose:        nesting node = null
verbose:    }
verbose:    accumulateTemplateMatches(<b>)
verbose:    {
verbose:        Static content nodes:
verbose:            <p> with depth 3
verbose:        nesting node = null
verbose:    }
```
60 a.xsl

```
<?xml version="1.0" encoding="UTF-8"?>
<xsl:stylesheet xmlns:xsl="http://www.w3.org/1999/XSL/Transform" version="1.0"><xsl:import href="b.xsl"/>
<xsl:import href="b.xsl"/>
<xsl:import href="b.xsl"/>
<xsl:template match="a">
<o>
   <xsl:apply-templates select="b/b/b"/>

</o></xsl:template>
</xsl:stylesheet>
```
10 b.xsl

```
<?xml version="1.0" encoding="UTF-8"?>
<xsl:stylesheet xmlns:xsl="http://www.w3.org/1999/XSL/Transform" version="1.0"><xsl:template match="b">
<p n="0" x="{@battr}"></p></xsl:template>
</xsl:stylesheet>
```

4.1.2 EXAMPLE 2 input.xml

```
<a>
  <b battr="Some unique contents for first b"/>
  <b battr="Some unique contents for second b"/>
  <b battr="Some unique contents for third b"/>
</a>
```

*FIG. 28D* output.xml

```
<o>
  <p>
    <count>1</count>
    <contents>Some unique contents for first b</contents>
  </p>
  <p>
    <count>2</count>
    <contents>Some unique contents for second b</contents>
  </p>
  <p>
    <count>3</count>
    <contents>Some unique contents for third b</contents>
  </p>
</o>
```

Execution log

```
verbose:  DynamicContentMatch
verbose:  {
verbose:      text=Some unique contents for third b
verbose:      inputAttributeName=battr
verbose:      inputParentNode=[b: null]
verbose:      DynamicContentMatchDetailsForOutputTextNode
verbose:      {
verbose:          outputNode=[#text: Some unique contents for third b]
verbose:      }
verbose:  }
verbose:  DynamicContentMatch
verbose:  {
verbose:      text=Some unique contents for second b
verbose:      inputAttributeName=battr
verbose:      inputParentNode=[b: null]
verbose:      DynamicContentMatchDetailsForOutputTextNode
verbose:      {
verbose:          outputNode=[#text: Some unique contents for second b]
verbose:      }
verbose:  }
```

FIG. 28D cont.

```
verbose:    DynamicContentMatch
verbose:    {
verbose:        text=Some unique contents for first b
verbose:        inputAttributeName=battr
verbose:        inputParentNode=[b: null]
verbose:        DynamicContentMatchDetailsForOutputTextNode
verbose:        {
verbose:            outputNode=[#text: Some unique contents for first b]
verbose:        }
verbose:    }
verbose:    accumulateTemplateMatches(<a>)
verbose:    {
verbose:        Static content nodes:
verbose:            <o> with depth 2
verbose:        nesting node = <o> with depth 2
verbose:        nesting node has following children:
```

```
verbose:         <o>
verbose:              TEXT_NODE(...)
verbose:              <p> (ancestor of <b>)
verbose:              TEXT_NODE(...)                              40
verbose:              <p> (ancestor of <b>)
verbose:              TEXT_NODE(...)
verbose:              <p> (ancestor of <b>)
verbose:              TEXT_NODE(...)
verbose:        This nesting node has a depth greater than or equal
                to the static content nodes of this template (nested
verbose:    }
verbose:    accumulateTemplateMatches(<b>)
verbose:    {
verbose:        Static content nodes:
verbose:            <p> with depth 3                              50
verbose:        nesting node = null
verbose:    }
verbose:    accumulateTemplateMatches(<b>)
verbose:    {
verbose:        Static content nodes:
verbose:            <p> with depth 3
verbose:        nesting node = null
verbose:    }
verbose:    accumulateTemplateMatches(<b>)
verbose:    {                                                     60
verbose:        Static content nodes:
verbose:            <p> with depth 3
verbose:        nesting node = null
verbose:    }
```

FIG. 28E cont.

a.xsl

```
<?xml version="1.0" encoding="UTF-8"?>
<xsl:stylesheet xmlns:xsl="http://www.w3.org/1999/XSL/Transform" version="1.0"><xsl:import href="b.xsl"/>
<xsl:import href="b.xsl"/>
<xsl:import href="b.xsl"/>
<xsl:template match="a">
<o>
    <xsl:apply-templates select="b/b/b"/>

</o></xsl:template>
</xsl:stylesheet>
```

10 b.xsl

```
<?xml version="1.0" encoding="UTF-8"?>
<xsl:stylesheet xmlns:xsl="http://www.w3.org/1999/XSL/Transform" version="1.0"><xsl:template match="b">
<p>
   <count>1</count>
   <contents><xsl:value-of select="@battr"/></contents>
  </p></xsl:template>
</xsl:stylesheet>
```

*FIG. 29*

4.2 NON-CONTINGUOUS STRUCTURES

Powerpoint seems to be using multiple "nesting nodes", that is, adding a chart impacts sections at the beginning of the document and at its end. Addressing multiple nesting nodes for a single input structure is challenging but remains possible.

input.xml

```
<a>
  <b battr1="Some unique contents for b"
     battr2="Some other unique contents for b"/>
</a>
``` output.xml

```
<o>
  <q>Some unique contents for b</q>
  <p pattr="Example of unique static contents"></p>
  <p pattr="Another example of static contents"></p>
  <p pattr="Yet another example of static contents"></p>
  <q>Some other unique contents for b</q>
</o>
```

Execution log

```
verbose:  DynamicContentMatch
verbose:  {
verbose:      text=Some other unique contents for b
verbose:      inputAttributeName=battr2
verbose:      inputParentNode=[b: null]
verbose:      DynamicContentMatchDetailsForOutputTextNode
verbose:      {
verbose:          outputNode=[#text: Some other unique contents for b]
verbose:      }                                                           10
verbose:  }
verbose:  DynamicContentMatch
verbose:  {
verbose:      text=Some unique contents for b
verbose:      inputAttributeName=battr1
verbose:      inputParentNode=[b: null]
verbose:      DynamicContentMatchDetailsForOutputTextNode
verbose:      {
verbose:          outputNode=[#text: Some unique contents for b]
verbose:      }
verbose:  }                                                               20
```

FIG. 30

4.3 AMBIGUOUS STRUCTURES (NON-INVERSIBLE TRANSFORMATIONS)

Of course, the general problem of identifying a transform from an example input and output document is ill-posed. Consider the simple example below. Where do the < q >'s in the output belong to? Some might just be static header or footer contents of < a >'s or < b >'s but there is no way to know without making further assumptions. More sophisticated pattern-matching, more assumptions on the XML Schemas of particular applications and more configurability of AutoXSLT, and other conventions on the input/output pairs will help handle such situations if they are simple enough.

input.xml

```
<a>
  <b battr1="Some unique contents for b"
      battr2="Some other unique contents for b"/>
</a>
``` output.xml

```
<o>
  <q/>
  <q/>
  <q/>
  <q/>
  <q/>
  <q/>
  <q/>
  <q/>
  <q/>Some unique contents for b</q>          10
  <q/>
  <q/>
  <q/>
  <q/>
  <q/>
  <q/>
  <q/>
  <q/>
  <q/>Some other unique contents for b</q>
  <q/>                                         20
  <q/>
  <q/>
  <q/>
  <q/>
  <q/>
</o>
```

METHOD FOR AUTOMATICALLY CREATING TRANSFORMS

FIELD OF THE INVENTION

The present invention generally relates to information technology, and, more particularly, to information technology transformations.

BACKGROUND OF THE INVENTION

In principle, an extensible markup language (XML) to XML transformation can be performed by using extensible stylesheet language (XSL) transformations. However, without in-depth knowledge of the target XML schema, it is difficult to construct an XSL transformation to the target XML. In particular, many applications that produce formatted documents, such as, for example, Microsoft® Word word processor, PowerPoint presentation software, and Excel spreadsheet software, now support an XML format. But it remains a significant challenge to hand-code the transformations necessary to generate a high-quality target document due to the complexity of the target XML. For example, an existing approach includes the current document generation framework in Rational Software Architect, wherein an extensible stylesheet language transformation (XSLT) stylesheet needs to be manually created to transform the intermediate model.xml generated by the framework into a Word document in xml format.

SUMMARY OF THE INVENTION

Principles of the present invention provide techniques for automatically creating transforms. An exemplary method (which can be computer-implemented) for automatically creating and using a transform to generate a document in a target format from a source document, according to one aspect of the invention, can include steps of obtaining a source document, wherein the source document is in a structured format and wherein the source document comprises structured information from a domain-specific representation, creating a transform, wherein creating the transform comprises creating a specially-tagged version of the source document in the structured format, using a target application to create an output document in a target format with one or more corresponding tags, and applying an algorithm to automatically generate a transform, and using the transform to generate a version of the source document in a target format.

In an embodiment of the invention, an exemplary method for generating a database of one or more transforms can include obtaining an input and an output document that relate to a target XML document, identifying one or more corresponding structures in the input document and the output document, using the one or more corresponding structures to create a transform, and storing the transform in a database.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

BRIEF DESCRIPTION OF DRAWINGS

FIG. 8 is a diagram illustrating an exemplary technique for generating a work product, according to another aspect of the invention;

FIG. 22 is a diagram illustrating static structure and static contents, according to another aspect of the invention;

FIG. 23 is a diagram illustrating static structure and dynamic contents, according to another aspect of the invention;

FIG. 24A is a diagram illustrating dynamic structure and notion of nesting node, according to another aspect of the invention;

FIG. 24B is a diagram illustrating dynamic structure and notion of nesting node, according to another aspect of the invention;

FIG. 24C is a diagram illustrating dynamic structure and notion of nesting node, according to another aspect of the invention;

FIG. 25A is a diagram illustrating nested dynamic structure, according to another aspect of the invention;

FIG. 25B is a diagram illustrating nested dynamic structure, according to another aspect of the invention;

FIG. 25C is a diagram illustrating nested dynamic structure, according to another aspect of the invention;

FIG. 25D is a diagram illustrating nested dynamic structure, according to another aspect of the invention;

FIG. 25E is a diagram illustrating nested dynamic structure, according to another aspect of the invention;

FIG. 26A is a diagram illustrating sequential dynamic structure, according to another aspect of the invention;

FIG. 26B is a diagram illustrating sequential dynamic structure, according to another aspect of the invention;

FIG. 26C is a diagram illustrating sequential dynamic structure, according to another aspect of the invention;

FIG. 26D is a diagram illustrating sequential dynamic structure, according to another aspect of the invention;

FIG. 26E is a diagram illustrating sequential dynamic structure, according to another aspect of the invention;

FIG. 26F is a diagram illustrating sequential dynamic structure, according to another aspect of the invention;

FIG. 27A is a diagram illustrating mixed dynamic structure, according to another aspect of the invention;

FIG. 27B is a diagram illustrating mixed dynamic structure, according to another aspect of the invention;

FIG. 27C is a diagram illustrating mixed dynamic structure, according to another aspect of the invention;

FIG. 27D is a diagram illustrating mixed dynamic structure, according to another aspect of the invention;

FIG. 27E is a diagram illustrating mixed dynamic structure, according to another aspect of the invention;

FIG. 28A is a diagram illustrating sequential dynamic structure, according to another aspect of the invention;

FIG. 28B is a diagram illustrating sequential dynamic structure, according to another aspect of the invention;

FIG. 28C is a diagram illustrating sequential dynamic structure, according to another aspect of the invention;

FIG. 28D is a diagram illustrating sequential dynamic structure, according to another aspect of the invention;

FIG. 28E is a diagram illustrating sequential dynamic structure, according to another aspect of the invention;

FIG. 29 is a diagram illustrating non-contiguous structures, according to another aspect of the invention; and FIG. 30 is a diagram illustrating ambiguous structures, according to another aspect of the invention.

DETAILED DESCRIPTION OF PREFERRED EMBODIMENTS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

Principles of the present invention include techniques for constructing automatic transforms for generating multi-format documents from XML-based software modeling environments. Principles of the present invention also include a framework that supports the rigorous distinction between content and representation, and avoids the resource investment needed to create transformations that go from a particular representation to another representation (resulting among other benefits in the "separation of skills"). Both content and representation artifacts can be, for example, XML documents. Additionally, transformations between contents and representations may be implemented in many different ways.

One or more embodiments of the invention include an XML-based document generation framework via automatic transform constructing, which works in the same way with, for example, Microsoft® Word word processor, Microsoft® Excel spreadsheet software, hypertext markup language (HTML), rational software architect (RSA), contents from relational databases (RDBs), portable document format (PDF) and any other format as long as the vendor supports an XML format or faithful transformation. The framework reduces the complexity of the creation of transformations to the complexity of the structure of the contents itself, rather than the complexity of the formatting. Formatting can be arbitrarily complex without impacting the cost of creating transformations. Moreover, changes to the formatting can be accommodated easily via regeneration of the transform, drastically simplifying the adaptation and evolution of document formats.

For example, one can write XSL transformations manually by extracting contents from the RSA model document. Also, for example, one can automatically create a transformation program from a pair of prototypical source and target documents.

Furthermore, it is described herein, for example, how one can automatically create a transformation program to generate a service model document in the Word format by providing simple, yet representative, input and output files.

Figure 1:
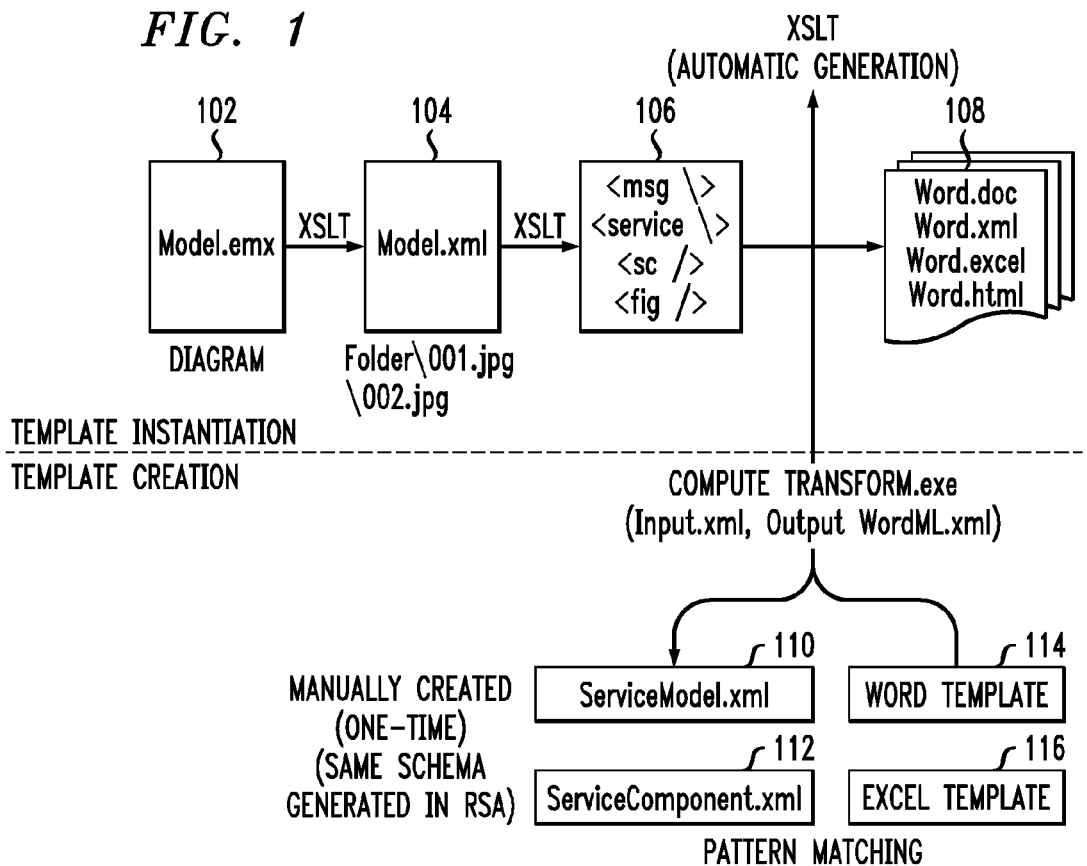
FIG. 1 is a diagram illustrating a document generation framework via automatic transform constructing, according to one aspect of the invention.

FIG. 1 is a diagram illustrating a document generation framework via automatic transform constructing, according to one aspect of the invention. FIG. 1 depicts template instantiation, which includes the elements of Model.emx 102, the representation of rational software architect (RSA) modeling results in XML metadata interchange format (XMI), Model.xml 104, a domain-specific XML representation of the service model 106 and a version of the service model in a specific document format 108.

FIG. 1 also depicts template creation, which includes the elements of ServiceModel.xml 110, ServiceComponent.xml 112, Word Template 114 and Excel Template 116.

For a given model, a RSA's document generation framework creates an intermediate Model.xml 104 and graphic components such as, for example, folders/diagram1.jpg and so on. An XSL transformation can be used to build a domain-specific XML representation of the service model 106 such as, for example, <message/> and <services/>, which are extracted from an SOA solution modeling environment. Because the target XML is under the author's control, this transformation is straightforward and simple to write. Another XSL transformation is used to generate a version of the service model in a specific document format 108 such as, for example, Microsoft® Word word processor, Microsoft® Excel spreadsheet software, or HTML.

To construct the second XSL transformation, a prototypical ServiceModel.xml 110 file is created in the domain-specific XML, as well as the desired corresponding target XML file using the target application (for example, Microsoft® Word word processor, Microsoft® Excel spreadsheet software, or a WYSIWYG HTML Editor).

For example, in FIG. 1, ServiceModel.xml 110 is the input XML file for the selected Word Template 114 (expected output in XML format). ServiceComponent.xml 112 is the input for the selected Excel Template 116 (expected out in XML format). For each training pair, an XSLT stylesheet can be constructed automatically, as described herein.

Once the XSLT is constructed, the input XML file (that, for example, includes <message/> and <services/>) can be translated (for example, automatically) to a well-formatted document such as, for example, Word.doc, Word.xml, word.html, and word.excel.

In one or more embodiments of the present invention, a target XML document can be represented as a tree structure. One or more embodiments of the invention employ tag-based pattern matching to identify corresponding sub-tree structures in a pair of prototypical input and output documents, without needing to look at attribute values. The pattern-matching mechanism identifies sub-trees with a common parent, and that are identical (structurally) except for a particular string difference.

There are two different kinds of nodes in the target document tree: static content nodes and nesting nodes. Static content nodes are nodes in the output pattern that will be generated directly without translation in the resulting template. A nesting node is the parent node that contains the sub-tree which represents the input pattern In order to effectively leverage the proposed pattern matching algorithm, potential problems with matching should be minimized as much as possible. For example, if text in the output document is edited (WYSIWYG), the matching string could be "broken" by formatting tags, etc. The generated transform could be, for example, suboptimal if the output is edited, and additional "stuff" is generated (for example, unnecessary formatting tags, etc.).

If an input generates a sequence of sibling nodes, additional rules can be created to determine where to cut the output sequence. In one or more embodiments of the present invention, assumptions include the following: each input node generates a single nesting node and one or more embodiments of the invention can handle specific cases of multiple nesting nodes, but the generic case would be difficult to support.

Figure 2:
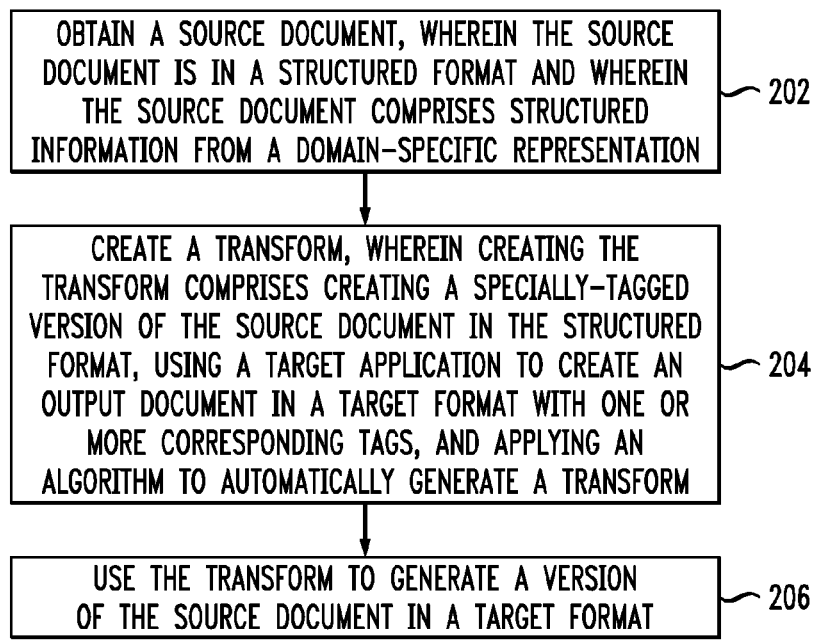
FIG. 2 is a flow diagram illustrating automatically creating and using a transform to generate a document in a target format from a source document, according to another aspect of the invention.

FIG. 2 is a flow diagram illustrating automatically creating and using a transform to generate a document in a target format from a source document, according to another aspect of the invention. Step 202 includes obtaining a source document, wherein the source document is in a structured format and wherein the source document comprises structured information from a domain-specific representation. A structured format can include, for example, extensible markup language (XML). Also, domain-specific denotes that the source document exhibits some well-defined structure, rather than including completely arbitrary content, and that that structure can be described using an XML representation. An example of a domain, for instance, is a service design for SOA-based solutions, or operational modeling.

The source document in a structured format can include, for example, one or more elements that describe a message format exchanged between two or more web services (such as, for example, "<message/>"). Also, the source document in a structured format can include one or more elements that describe a service that comprises a service-oriented architecture (SOA)-based solution (such as, for example, "<services/>"). The source document can also, for example, be extracted from a service-oriented architecture (SOA) solution modeling environment.

Step 204 includes creating a transform, wherein creating the transform comprises creating a specially-tagged version of the source document in the structured format, using a target application to create an output document in a target format with one or more corresponding tags, and applying an algorithm to automatically generate a transform. The specially-tagged source document contains a unique identifier (for example, a pre-defined string) representing each item of information which is to be included in the output document. These identifiers are the corresponding tags which must appear in the output document. For example, the word "ServiceModelDocumentTitle" can be used to represent the title of a document. In the output document, "ServiceModelDocumentTitle" should appear in the location where the document title is desired in the output document.

A transform can include, for example, an extensible stylesheet language transformation (XSLT) document. Using a target application to create an output document in a target format with corresponding tags can include, for example, using Microsoft® Word word processor to create an output document in Microsoft® Word format. Also, the specially-tagged version of the source document can include, for example, one or more unique identifiers in place of each item of structured information which is to appear in the output document.

Applying an algorithm to automatically generate a transform can include identifying one or more corresponding structures in the source document and the output document, and analyzing the one or more corresponding structures to create a transform.

Step 206 includes using the transform to generate a version of the source document in a target format. The target format can include, for example, Microsoft® Word word processor, Microsoft® Excel spreadsheet software, hypertext markup language (HTML), rational software architect (RSA), content from a relational database (RDB) and/or portable document format (PDF).

Additionally, the source document can also be used to create an intermediate document, wherein the intermediate document can include, for example, an XML metadata and/or one or more graphic components. Also, the document in the target format can be automatically translated into a well-formatted document. One or more embodiments of the invention may also include storing the created transform in a database (for example, a searchable database).

Figure 3:
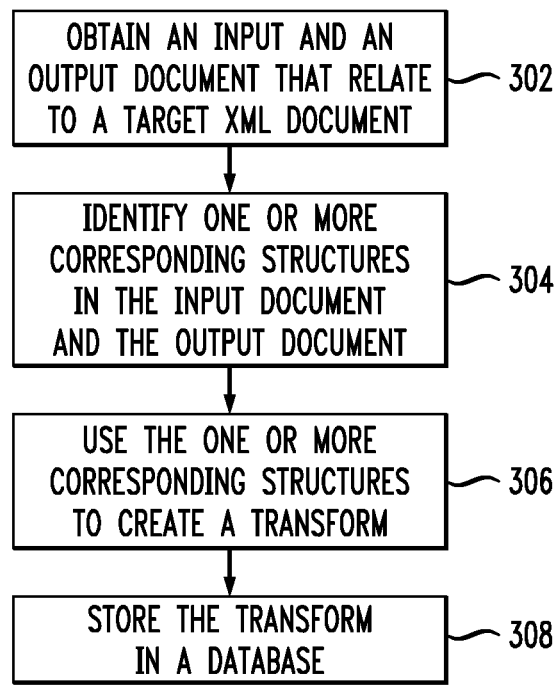
FIG. 3 is a flow diagram illustrating generating a database of one or more transforms, according to another aspect of the invention.

FIG. 3 is a flow diagram illustrating generating a database of one or more transforms, according to another aspect of the invention. Step 302 includes obtaining an input and an output document that relate to a target XML document. The input document can include, for example, an intermediate XML document, and it contains variable content matching some well-defined structure. That variable content must also appear in the output document. Step 304 includes identifying one or more corresponding structures in the input document and the output document.

Step 306 includes using the one or more corresponding structures to create a transform. In order to create the transform, the variable content is stripped from both the input and output document, and those locations (of the variable content) are marked for replacement with the appropriate variable content when a different instance of an input document is seen. Step 308 includes storing the transform in a database. It is to be appreciated that the techniques described in FIG. 3 can be carried out in conjunction with the techniques described in FIG. 2.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 4:
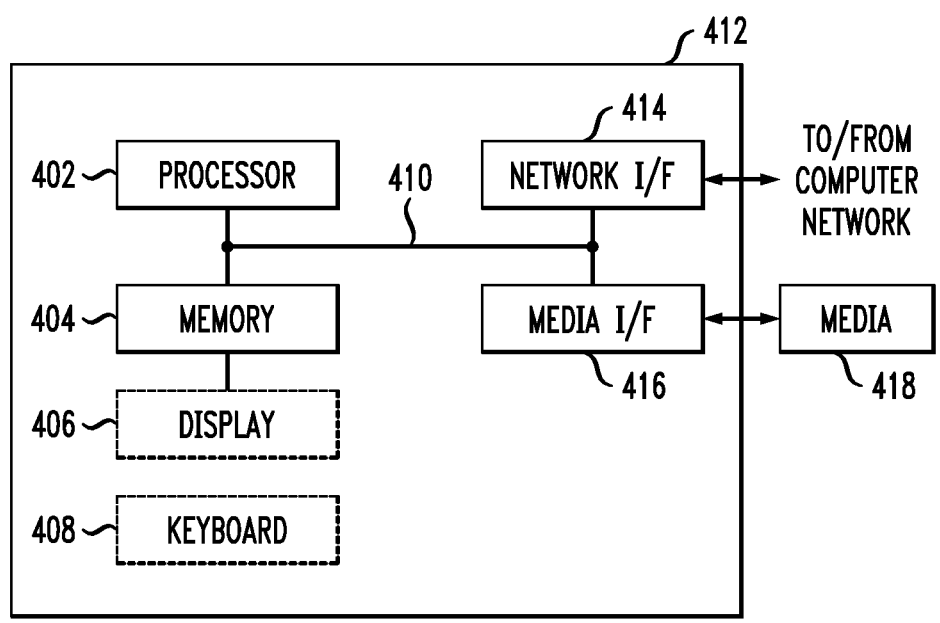
FIG. 4 is a system diagram of an exemplary computer system on which at least one embodiment of the present invention can be implemented.

At present, it is believed that the preferred implementation will make substantial use of software running on a general-purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory (for example, memory 404), magnetic tape, a removable computer diskette (for example, media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

FIGS. 5 through 21 depict an exemplary, non-limiting technique for generating a work product in Microsoft® Word word processor (WordML). It is to be understood that the techniques illustrated in FIGS. 5 through 21 are merely exemplary embodiments, and that other programs may be used herewith, and various other changes and modifications may be made by one skilled in the art.

Generating a work product in Microsoft® Word word processor (WordML) format for a particular service-oriented modeling and architecture (SOMA) design model (derived, for example, from models created using the SOMA modeling environment) is detailed below.

Figure 5:
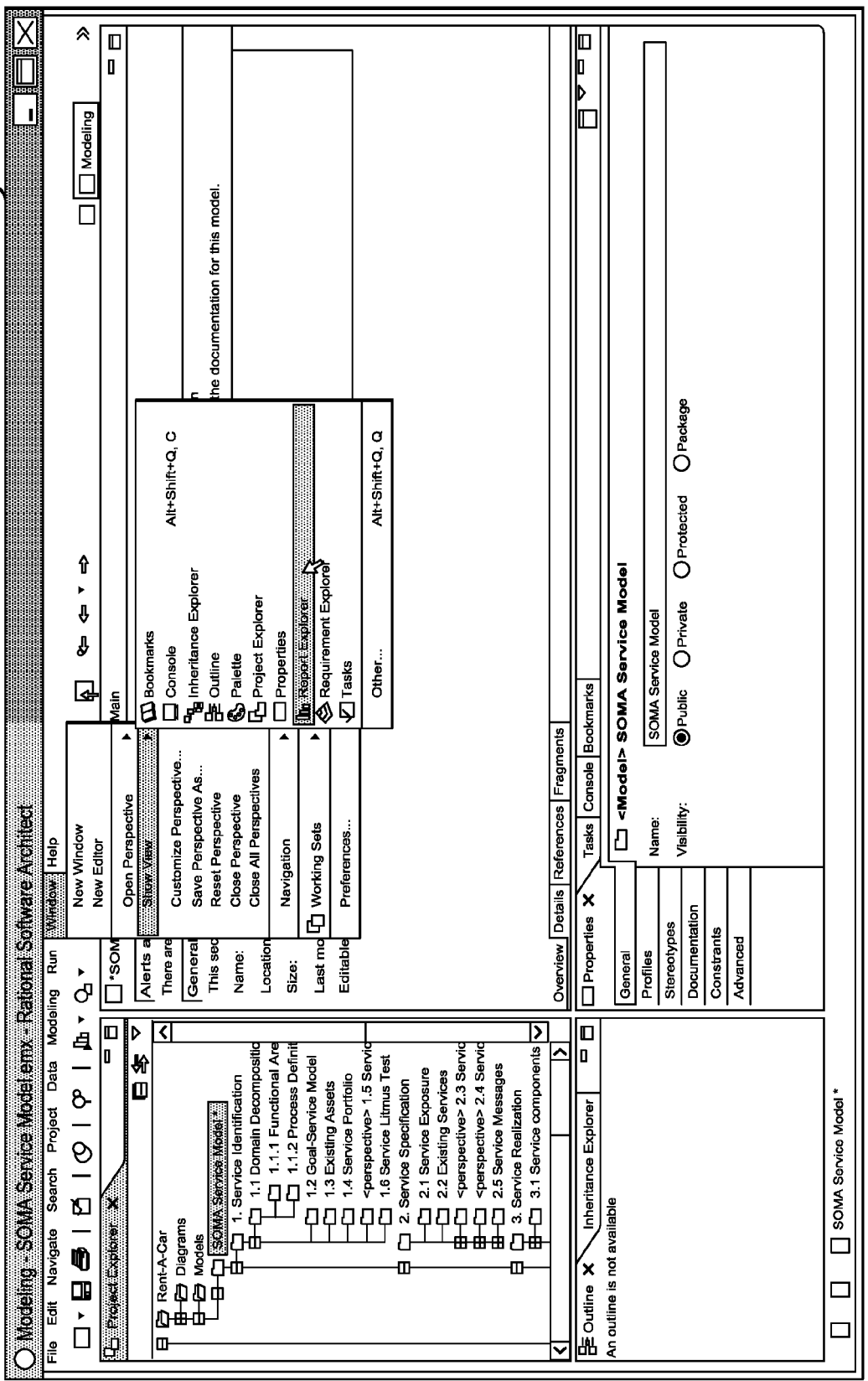
FIG. 5 is a diagram illustrating an exemplary technique for generating a work product, according to one aspect of the invention.

If the "Report Explorer" view is not visible in the Modeling perspective, one can use Window>Show View>Report Explorer, as illustrated in FIG. 5 via screen image 502, to add the view to the perspective. Once added to the perspective, one can move it so it is not shown in the same pane as the Project Explorer. This move will make it easier to select a model in the Project Explorer and select and invoke the report generation from the Report Explorer.

Figure 6:
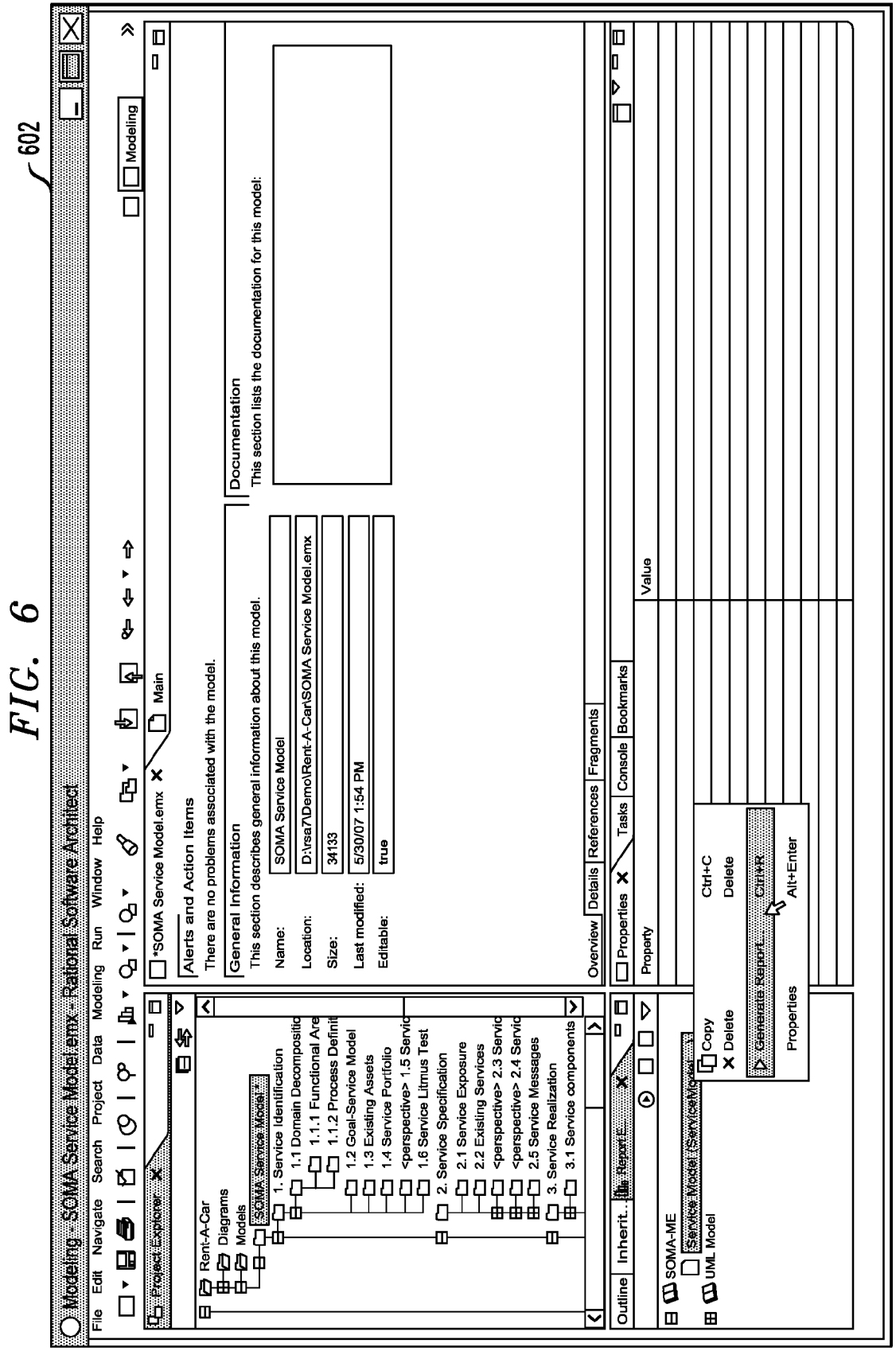
FIG. 6 is a diagram illustrating an exemplary technique for generating a work product, according to another aspect of the invention.
Figure 7:
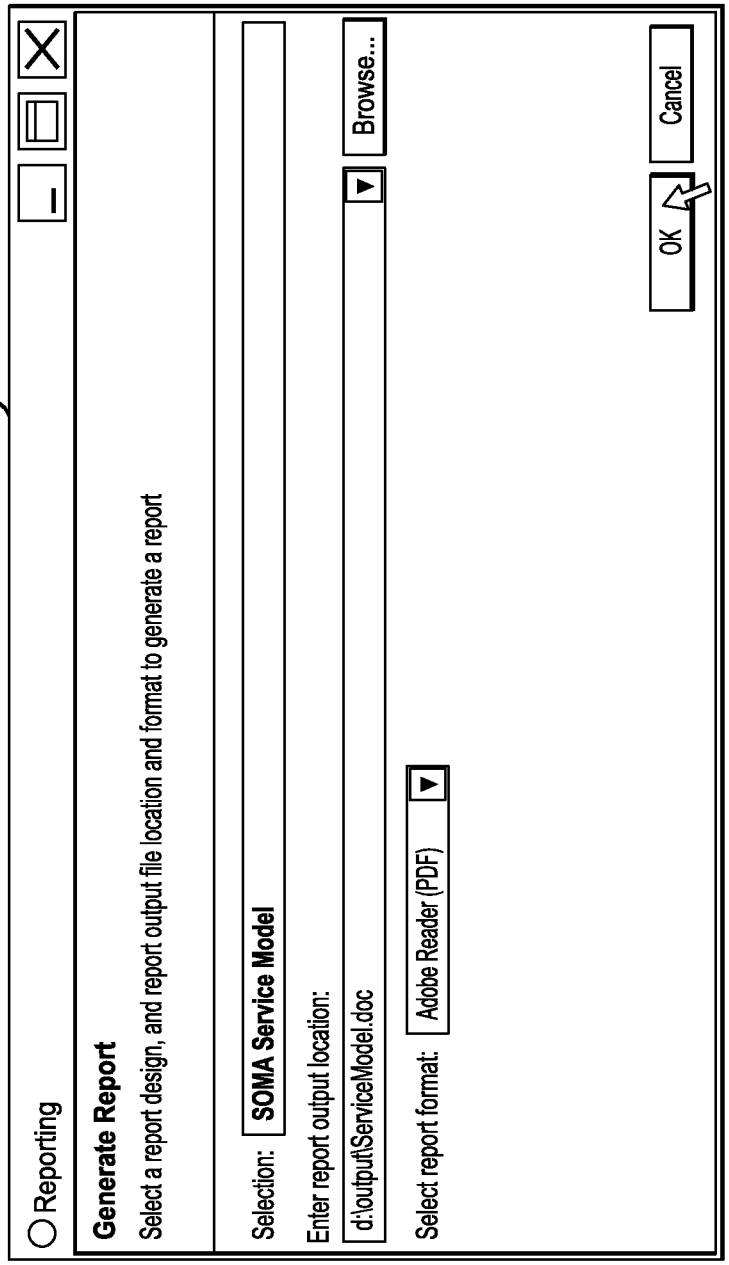
FIG. 7 is a diagram illustrating an exemplary technique for generating a work product, according to another aspect of the invention.

The SOMA Design Model can be selected in the Project Explorer view, and in the Report Explorer view by right-clicking on SOMA-ME>Service Model and selecting Generate Report, as illustrated in FIG. 6 via screen image 602. In the Reporting dialog, illustrated in FIG. 7 via screen image 702, one can select an output location and filename for the work product (and click "OK"). The report will be generated in the specified location, and can be viewed using, for example, Microsoft® Word 2003/2007. An exemplary report is depicted in FIG. 8 via image 802.

Figure 9:
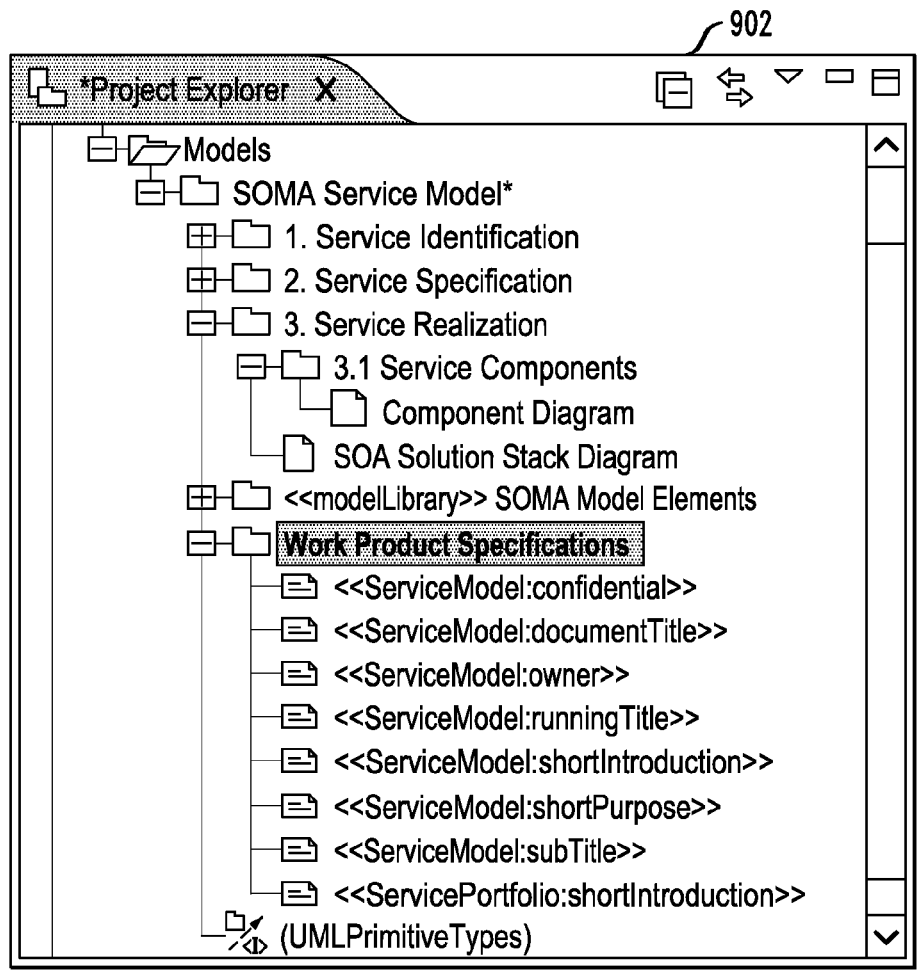
FIG. 9 is a diagram illustrating an exemplary technique for generating a work product, according to another aspect of the invention.

The content for the generated service model work product can extracted from the SOMA Design Model and organized into sections as described by, for example, the service model web presence developer (WPD). Such sections may include, for example, service portfolio, service hierarchy, service exposure, service dependencies, service composition and flow, and service messages. Annotations, in the form of model comments with particular keywords associated therewith, allow additional information to be embedded in the model in order to customize the content of the work product. A "Work Product Specifications" package can be created in the SOMA Design Model to contain selected annotations, as illustrated in FIG. 9 via screen image 902.

Figure 10:
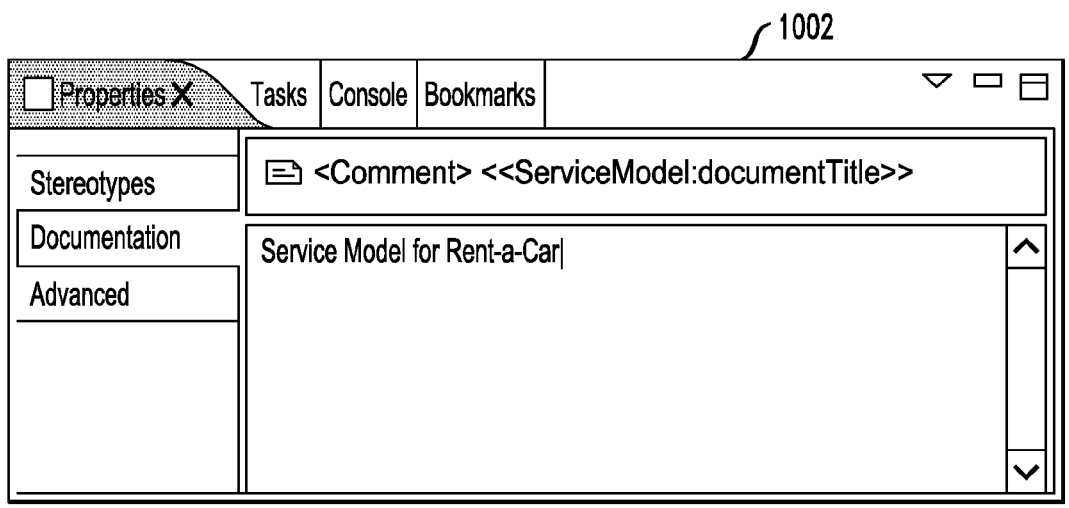
FIG. 10 is a diagram illustrating an exemplary technique for generating a work product, according to another aspect of the invention.

Comment text can be entered, for example, using the "Properties View" depicted in FIG. 10 via screen image 1002. A set of pre-defined annotations can be provided in order to customize the service model contents. The following annotations, for example, provide content for the title page of the work product:

<<ServiceModel:documentTitle>>—the title of the document
<<ServiceModel:subTitle>>—the document subtitle
<<ServiceModel:owner>>—the document owner
<<ServiceModel:customer>>—the client for whom the document is being prepared
<<ServiceModel:confidential>>—the confidentiality statement for the document.

Figure 11:
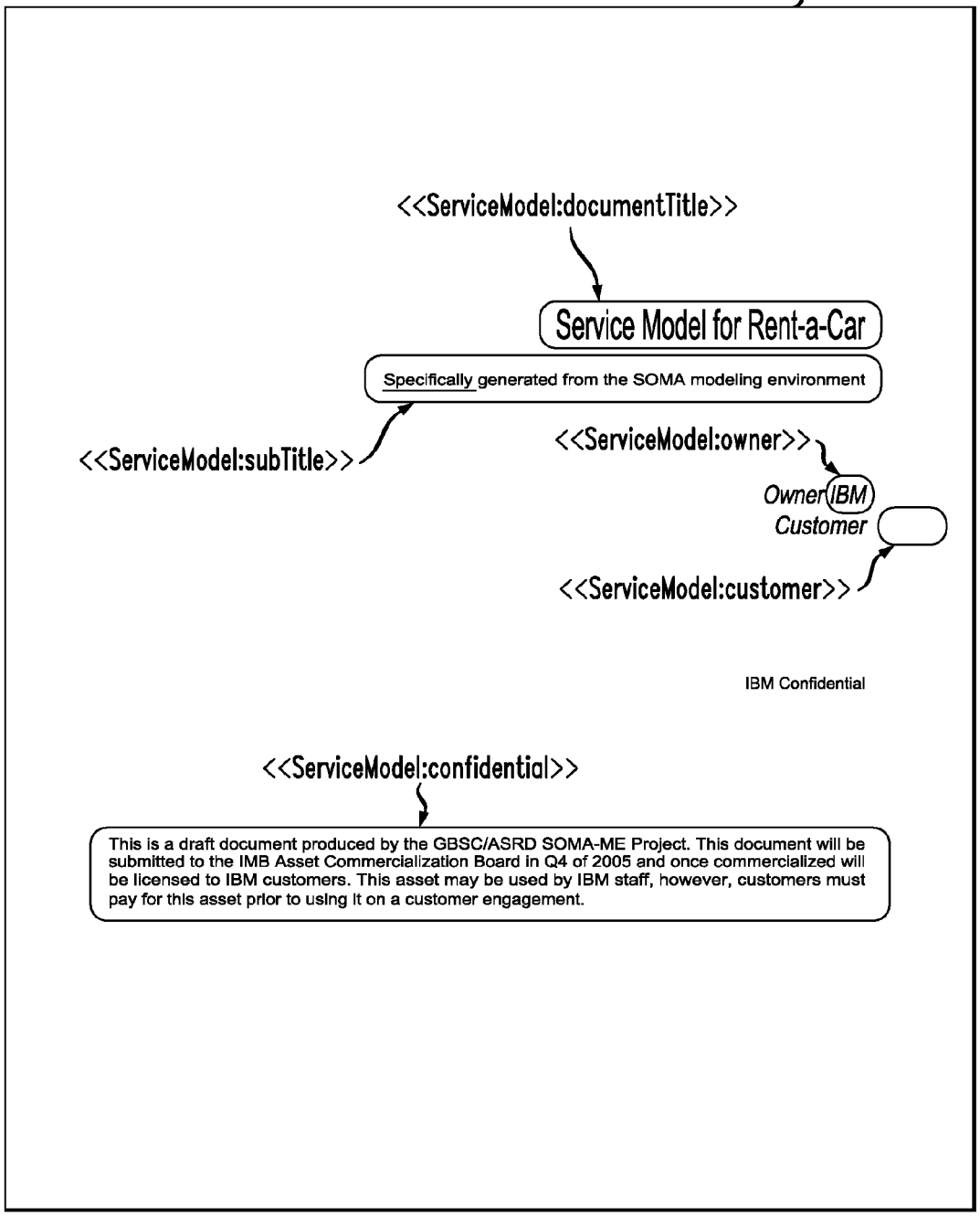
FIG. 11 is a diagram illustrating an exemplary technique for generating a work product, according to another aspect of the invention.

FIG. 11 illustrates the mapping of the annotations to their resulting output via image 1102.

In addition to the above, annotations can be defined for the introduction of the document and its various sections, such as, for example:

<<ServiceModel:shortIntroduction>>—the introduction for the service model
<<ServiceModel:shortPurpose>>—the purpose of the service model
<<ServicePortfolio:introduction>>—the intro for the Service Portfolio section
<<ServiceHierarchy:introduction>>—the intro for the Service Hierarchy section
<<ServiceExposure:introduction>>—the intro for the Service Exposure section
<<ServiceDependencies:introduction>>—the intro for the Service Dependencies section
<<ServiceComposition:introduction>>—the intro for the Service Composition & Flow section
<<ServiceMessages:introduction>>—the intro for the Service Messages section.

Figure 12:
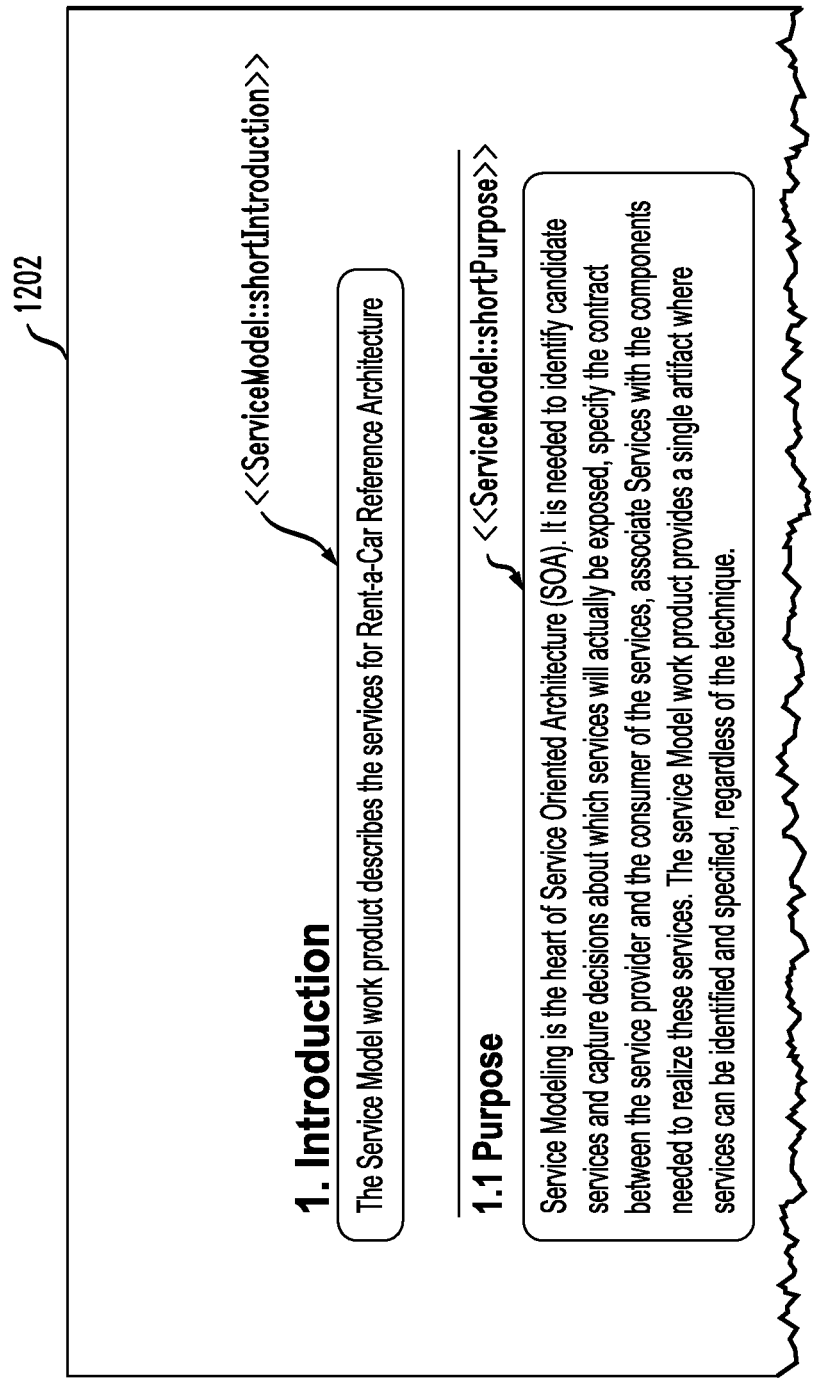
FIG. 12 is a diagram illustrating an exemplary technique for generating a work product, according to another aspect of the invention.
Figure 13:
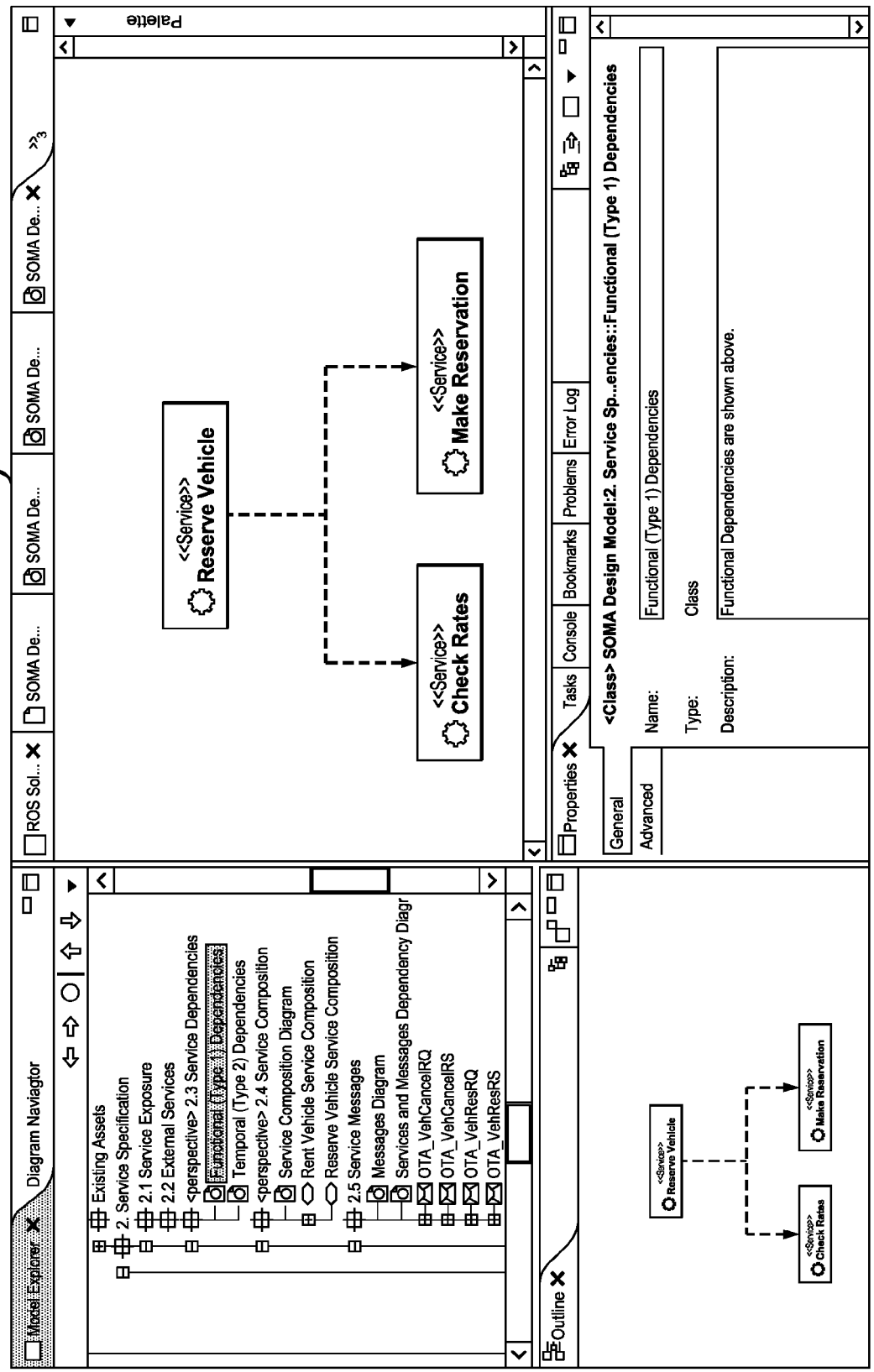
FIG. 13 is a diagram illustrating an exemplary technique for generating a work product, according to another aspect of the invention.
Figure 14:
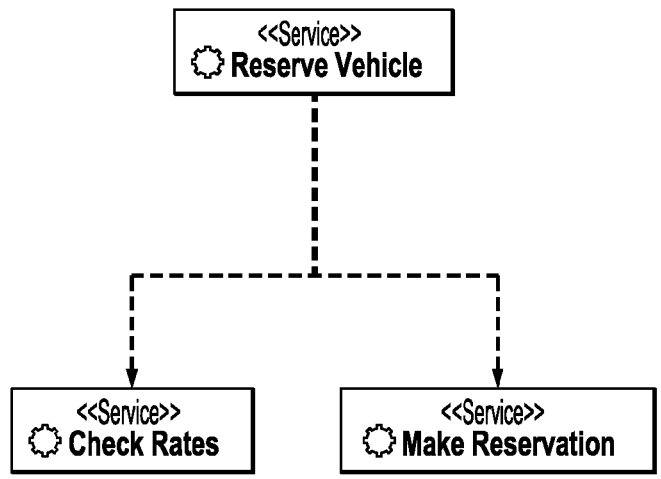
FIG. 14 is a diagram illustrating an exemplary technique for generating a work product, according to another aspect of the invention.

A mapping of a service model introduction is depicted in FIG. 12 via image 1202.

Diagrams extracted into the corresponding sections of the service model work product can also be annotated. The diagram title can be used as a sub-section name in the generated document, and its description can appear under the diagram. For example, the dependency diagram depicted in FIG. 13 (via screen image 1302) results in the service model output illustrated in FIG. 14 (via screen image 1402).

The work product generation framework of the SOMA modeling environment allows for additional customization of the template used to generate the work products. This allows users to customize the appearance and content of the generated service model in order to meet the requirements of a particular engagement. Template customization can include, for example, authoring the customized template, and importing the template into the modeling environment so that it is available for work product generation.

A work product template for the service model can be customized, for example, in multiple ways. For instance, the provided Microsoft® Word template can be modified directly using Microsoft® Word 2003/2007 word processor. The template can be found in the "resources" folder under the install location of the "SOMA-ME Work Product Generation" plug-in. The template can also be obtained from the SOMA-ME wiki.

Also, a new template can be created using any application that produces XML-based output (for example, IBM® Workplace Productivity tools, other OpenDocument format editors, HTML editors, etc).

In either case, the resulting template must contain a set of pre-defined tags that the work product generation framework matches against in order to generate its output. Tags and their respective meanings are defined in the tables below.

Figure 15:
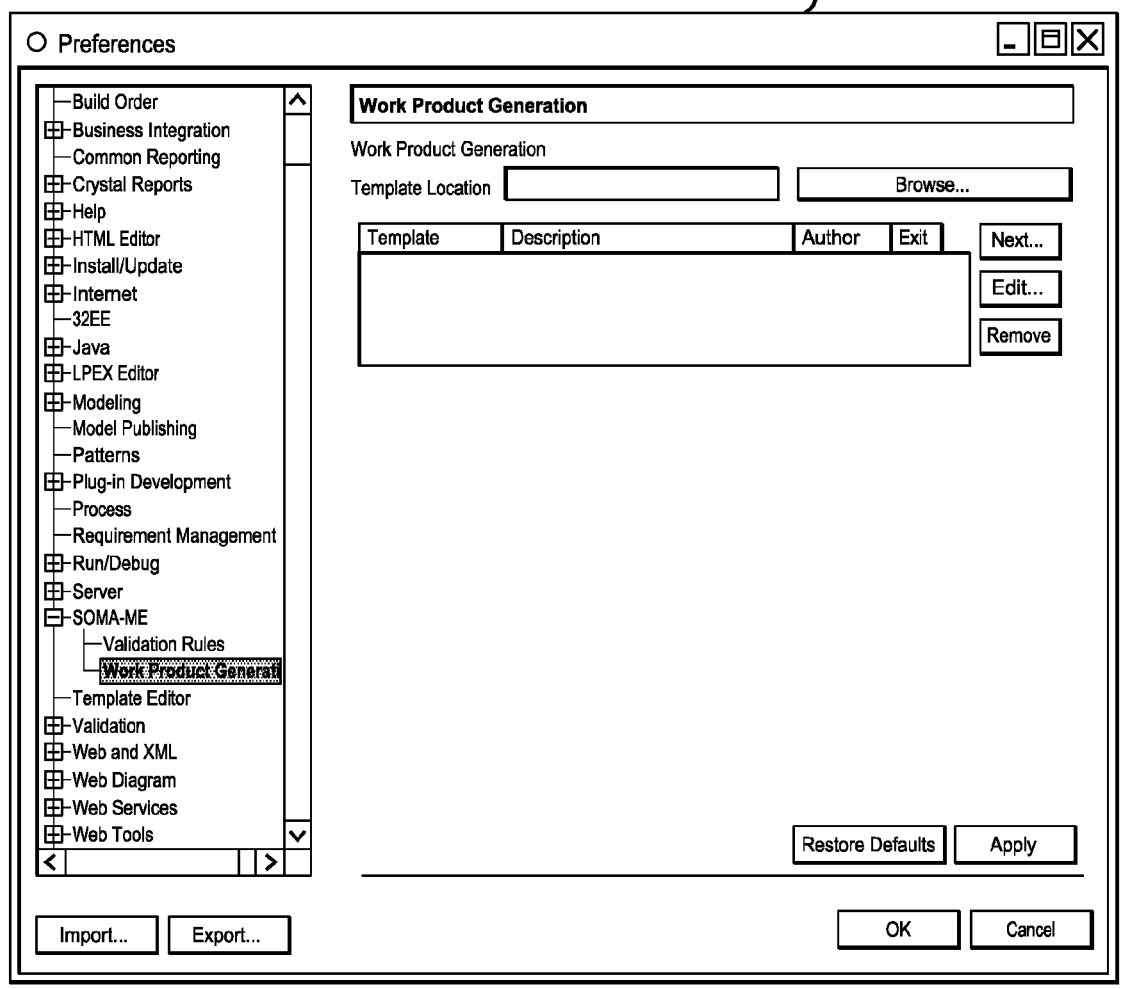
FIG. 15 is a diagram illustrating an exemplary technique for generating a work product, according to another aspect of the invention.

Once the work product template has been created or modified as described above, it must be imported for use by the work product generation framework. Template importation can include, for example, defining a location for the customized work product templates, and importing the templates themselves. Both steps are carried out in the "SOMA-ME→Work Product Generation" preference page, which is depicted in FIG. 15 via screen image 1502. The preference page includes a field for specifying the location for customized templates, and a list of the customized templates that have been defined for that location, along with a set of buttons for adding, modifying, or removing templates from the list.

Before customized work product templates can be used, a template location must be defined (this directory will be used to contain the definition of the template that the framework uses when publishing a custom report). To define a template location, one can select "Window→Preferences" from the main menu of the rational software architect/modeler (RSA/RSM), and choose "SOMA-ME→Work Product Generation" from the tree view at the left of the Preferences dialog shown in FIG. 15.

To set the template location, one can, for example, type the directory name into the "Template Location" field, or click on the "Browse . . . " button to select or create the directory using the File dialog. The directory must already exist.

Figure 16:
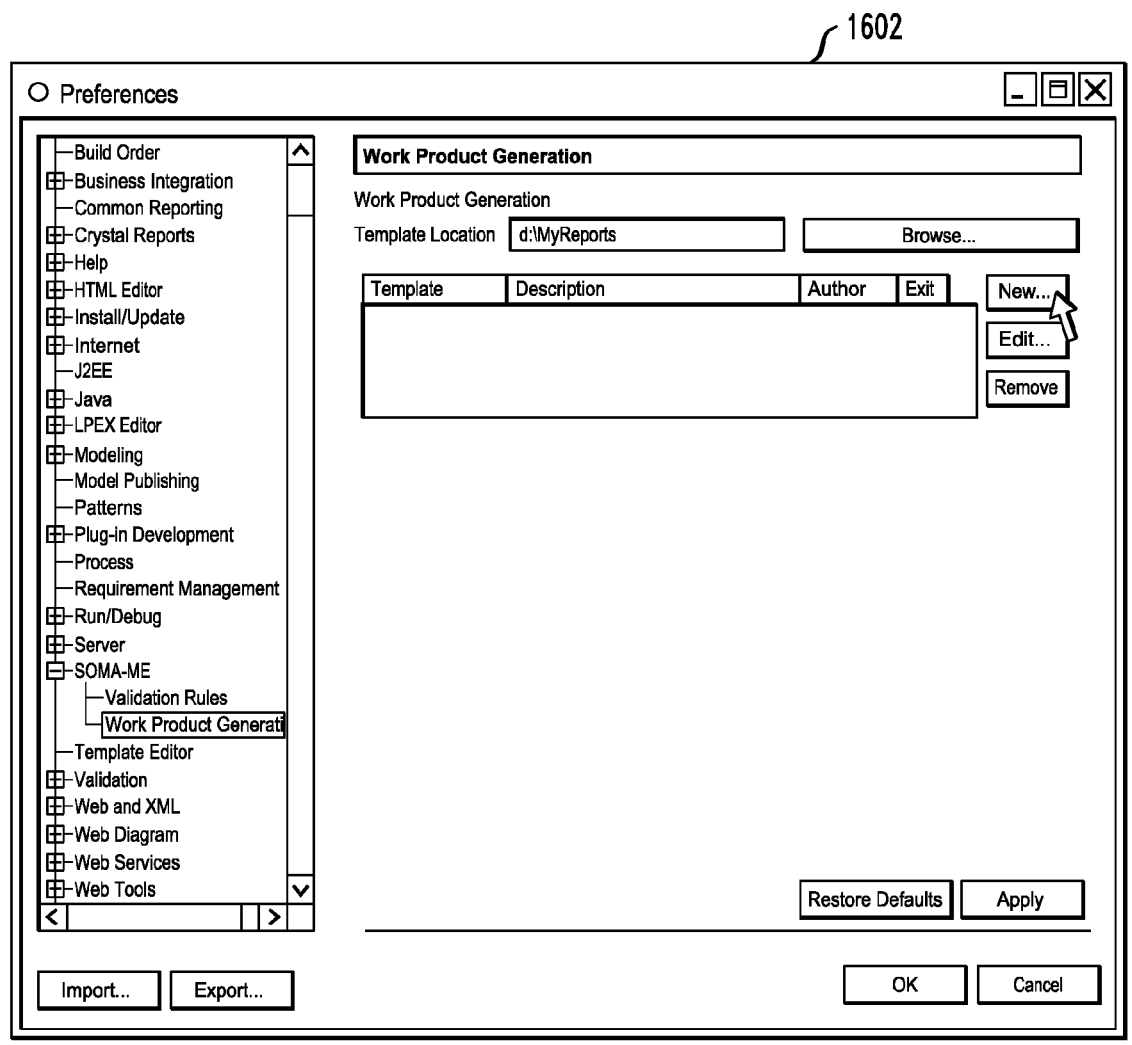
FIG. 16 is a diagram illustrating an exemplary technique for generating a work product, according to another aspect of the invention.
Figure 17:
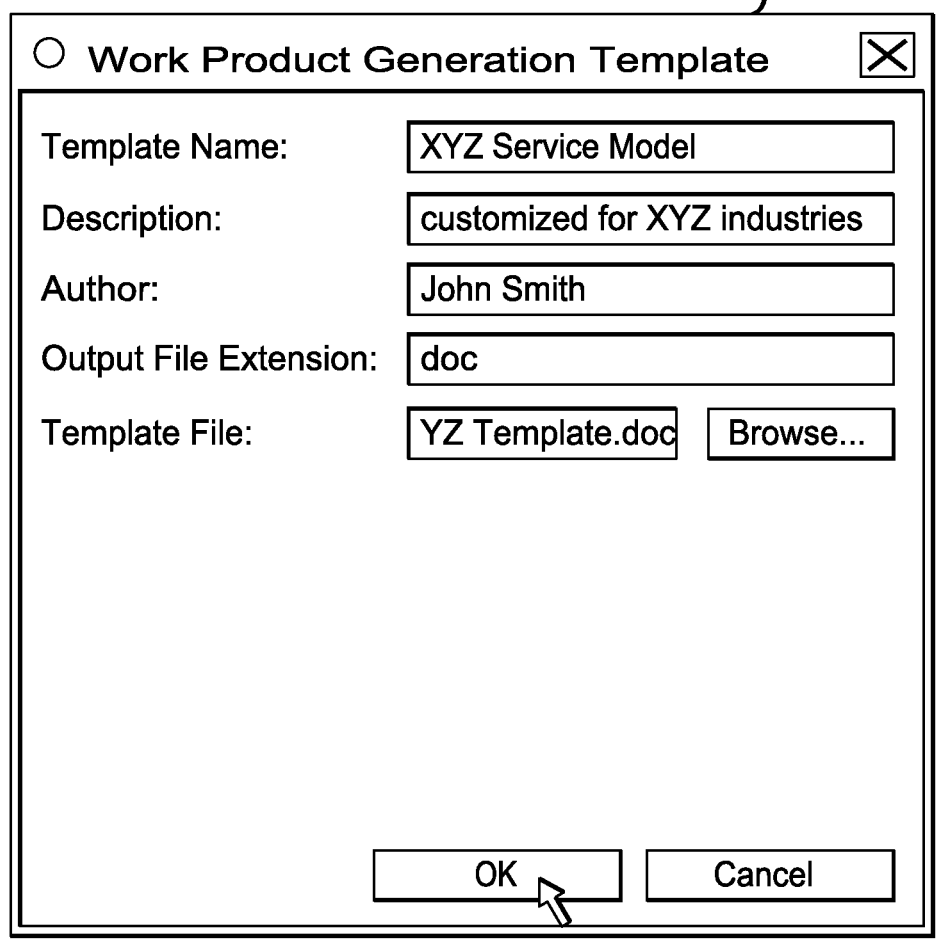
FIG. 17 is a diagram illustrating an exemplary technique for generating a work product, according to another aspect of the invention.
Figure 18:
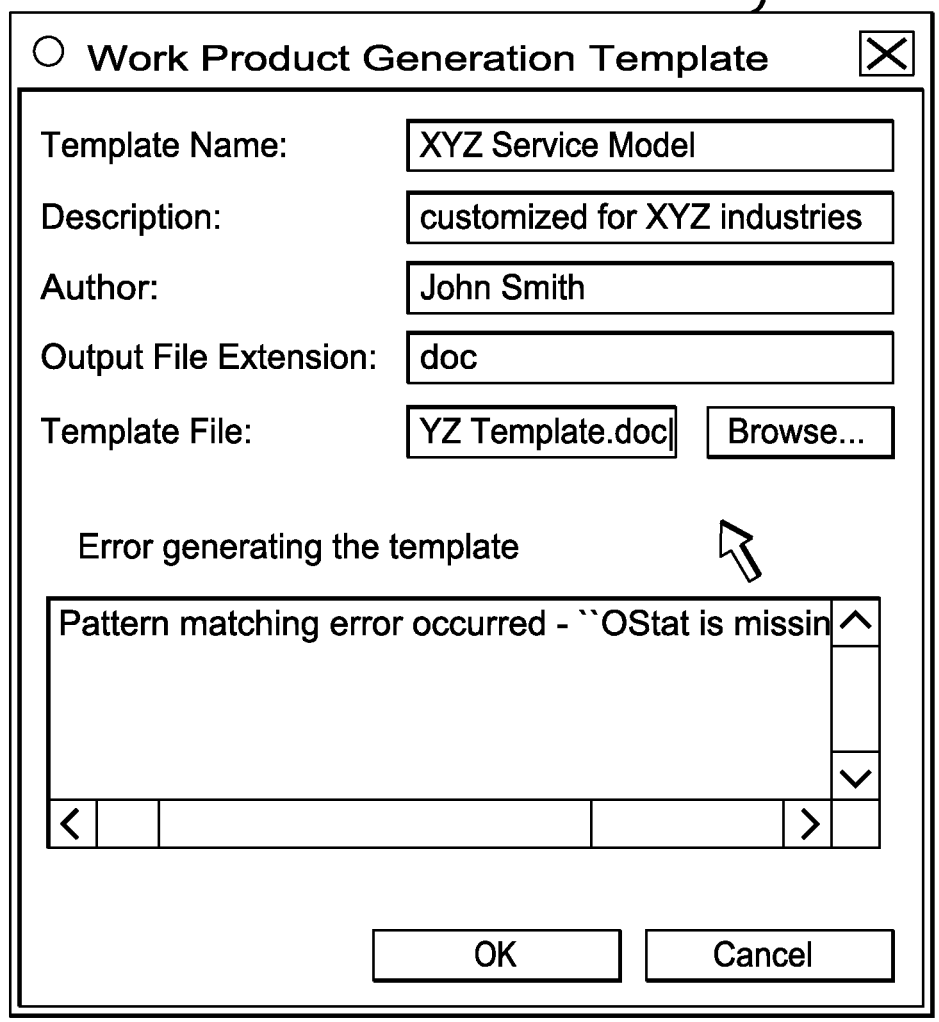
FIG. 18 is a diagram illustrating an exemplary technique for generating a work product, according to another aspect of the invention.

Once a template location has been defined, customized work product templates can be added (that is, imported) by clicking on the "New . . . " button, as depicted in FIG. 16 via screen image 1602. This action brings up the work product generation template dialog shown in FIG. 17 (via screen image 1702). As such, the following fields in the dialog must be filled in:

Template Name: a unique name for the customized template
Description: a description of the customized template
Author: the template author
Output File Ext: the file extension for the generated output (for example, "doc" for a Word file)
Template File: the filename of the customized template that was created or edited in the first step of the process The template file can be specified either by entering its name directly into the "Template File" field or by clicking on the "Browse . . . " button in the "Work Product Generation Template" dialog. When the template file field is filled in, the template is checked to ensure that its contents meet the requirements of the work product generation framework (for example, that it is an XML file, and it contains the pre-defined strings described above), and its template definition is generated.

To complete the addition of the template, the changes to the preferences must be applied by clicking on either the "Apply" or "OK" button at the bottom of the "Work Product Generation" preference page. If the template does not meet the framework requirements, error messages will be displayed in the dialog box, as illustrated in the example in FIG. 18 via screen shot 1802. Common errors, for example, include:
- Omitting one or more of the required pre-defined strings;
- Mis-typing one of the required pre-defined strings in the template;
- Duplicating a required pre-defined string in multiple places in the template; and
- Partially editing one of the required pre-defined strings in a WYSIWYG editor, which results in the text of the string being spread across multiple XML elements (for example, this can occur if a different font or style is applied to some portion of the string). This problem can be avoided by always entering each pre-defined string in its entirety. If a pre-defined string needs to be modified, it should be completely deleted and re-entered.

Figure 19:
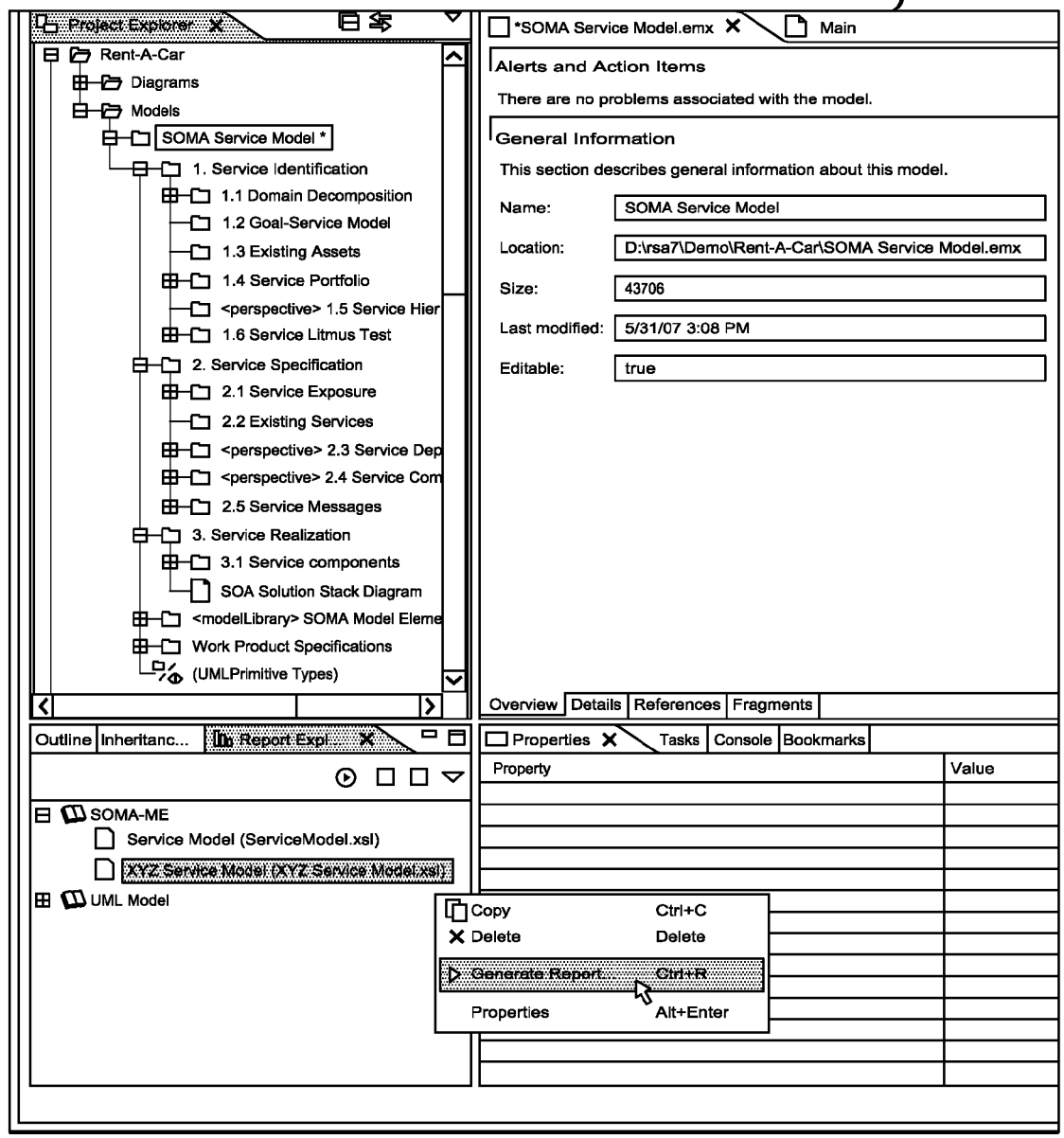
FIG. 19 is a diagram illustrating an exemplary technique for generating a work product, according to another aspect of the invention.

Once a template has been defined using the techniques described above, it is available for use in the same way as the default service model template. In order to generate a report using the customized template, one can select the model in the Model Explorer, and use the "Modeling→Publish→Report . . . " menu item from the main menu to bring up the "Generate Report" dialog. The customized template will appear in the dialog box, as depicted in FIG. 19 via screen image 1902. One can select the template, enter the filename for the generated report, and click on the "OK" button to generate the work product.

Figure 20:
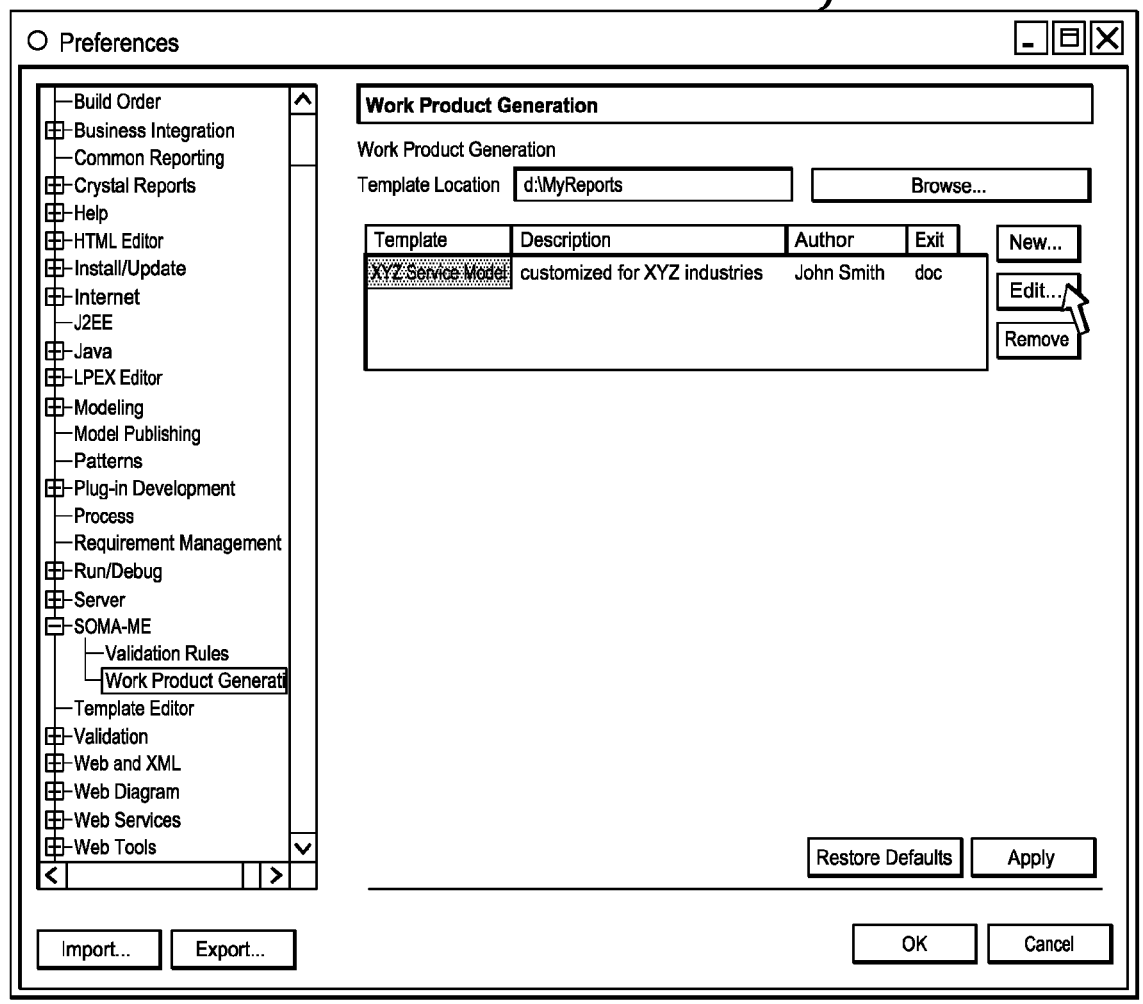
FIG. 20 is a diagram illustrating an exemplary technique for generating a work product, according to another aspect of the invention.

To modify an existing customized template, one can select the desired template in the "Preference Page" list, and click on the "Edit . . . " button, as illustrated in FIG. 20 via screen image 2002. This action brings up the "Work Product Generation Template" dialog (shown in FIG. 17). Any fields of the template information which need to be changed can be edited. If changes were made to the actual template document, its filename must be re-entered into the "Template File" field (either directly, or using the "Browse . . . " button). One can then hit the "OK" button to modify the template. Also, it is advantageous to also apply the changes using the "Apply" or "OK" button on the preference page.

Figure 21:
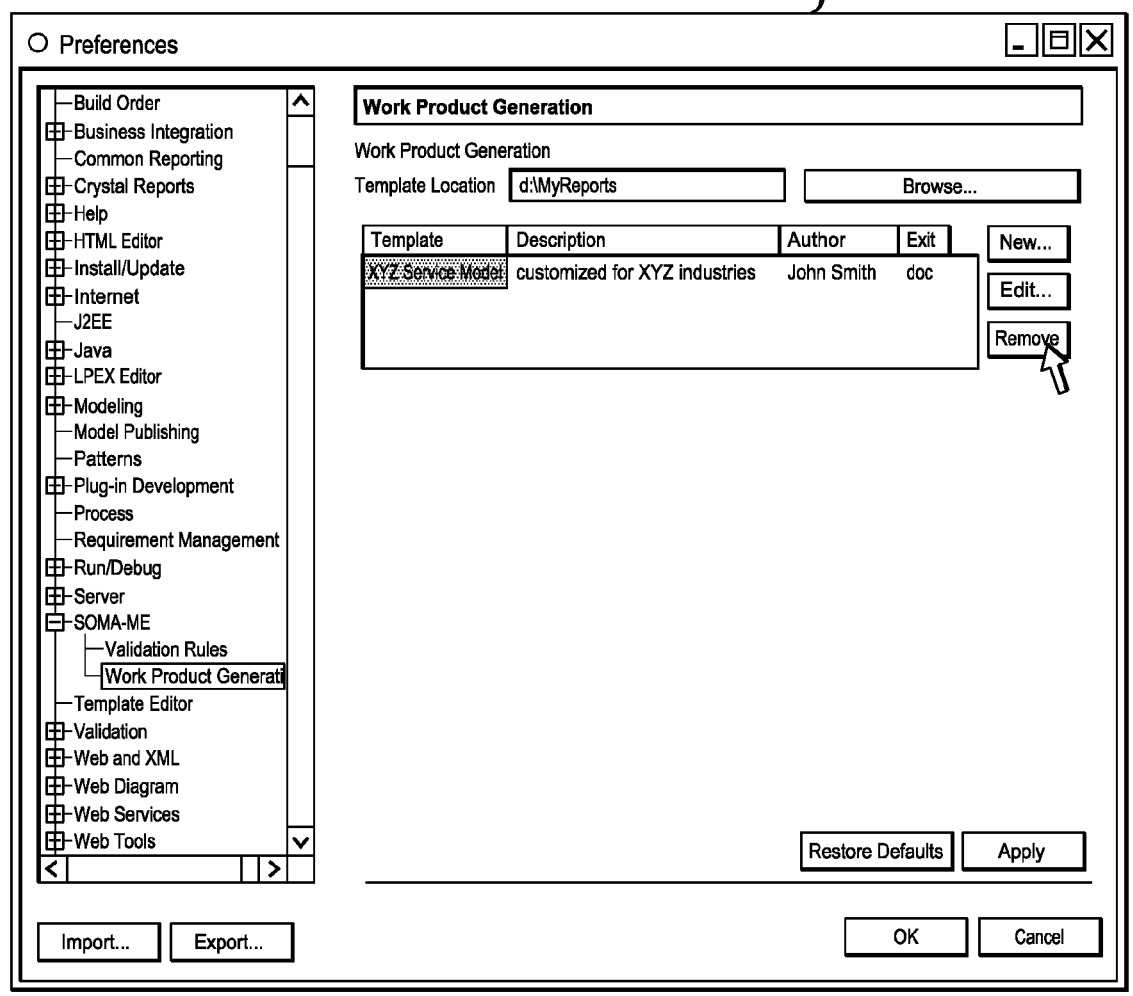
FIG. 21 is a diagram illustrating an exemplary technique for generating a work product, according to another aspect of the invention.

An unwanted template can be removed by selecting the template in the preference page list, and clicking on the "Remove . . . " button. FIG. 21 (via screen image 2102) depicts an example of removing the "XYZ Service Model" template. As above, it is advantageous to also apply the changes using the "Apply" or "OK" button on the preference page.

The following tables define the required pre-defined strings that must appear within the work product template. In many exemplary cases, two examples of each entity must be contained in the template document. In order to support diagram images, the application must have the ability to include links to external image files in some manner (for example, displaying the images inline as Microsoft® Word word processor does, or by providing a hyperlink to the external file). The tables below are organized by section of the service model to which the contained strings apply.

Title Page/Introduction:

| Pre-defined String | Meaning/Replacement Text |
|---|---|
| ServiceModelDocumentTitle | The document title |
| ServiceModelSubTitle | The document subtitle |
| ServiceModelRunningTitle | A running title for the document |
| ServiceModelOwner | The document owner |
| ServiceModelCustomer | The document customer |
| ServiceModelConfidentialityNotice | A confidentiality notice |
| ServiceModelShortIntroduction | A short introduction for the service model |
| ServiceModelShortPurpose | A short statement of purpose for the service model |

Service Portfolio:

| Pre-defined String | Meaning/Replacement Text |
|---|---|
| ServicePortfolioIntroduction | Introductory text for the service portfolio section |
| CandidateService1 | Candidate service name (first example) |
| CandidateServiceDescription1 | Description of the candidate service (first example) |
| CandidateServiceStatus1 | Status of the candidate service, "C" (that is, candidate) or "E" (that is, exposed) (first example) |
| CandidateService2 | Candidate service name (second example) |
| CandidateServiceDescription2 | Description of the candidate service (second example) |
| CandidateServiceStatus2 | Status of the candidate service, "C" or "E" (second example) |

Service Hierarchy:

| Pre-defined String | Meaning/Replacement Text |
|---|---|
| ServiceHierarchyIntroduction | Introductory text for the Service Hierarchy section |
| ServiceCategory1 | Category name (first example) |
| test.doc_images/SvcCat.JPG | Diagram image of services in category (first example) |
| CategorizedService1 | Name of Candidate Service in first category (first example) |
| CategorizedService2 | Name of Candidate Service in first category (second example) |
| ServiceCategory2 | Category name (second example) |
| test.doc_images/OtherSvcCat.JPG | Diagram image of services in category (second example) |
| CategorizedService3 | Name of Candidate Service in second category (first example) |
| CategorizedService4 | Name of Candidate Service in second category (second example) |

Service Exposure:

| Pre-defined String | Meaning/Replacement Text |
|---|---|
| ServiceExposureIntroduction | Introductory text for the service exposure section |
| ExposureDecision1 | Candidate service name (first example) |
| Exposed1 | Exposure decision for candidate service, yes ("Y") or no ("N") (first example) |
| EliminatesRedundancy1 | Would the candidate service eliminate redundancy? "Y" or "N" (first example) |
| BusinessAligned1 | Is the candidate service business aligned? "Y" or "N" (first example) |
| Composeable1 | Is the candidate service compose-able? "Y" or "N" (first example) |
| ExternalizedDescription1 | Does the candidate service have an externalized description? "Y" or "N" (first example) |
| ServiceExposureComment1 | Additional justification for exposure decision (first example) |
| ExposureDecision2 | Candidate service name (second example) |
| Exposed2 | Exposure decision for candidate service, "Y" or "N" (second example) |
| EliminatesRedundancy2 | Would the candidate service eliminate redundancy? "Y" or "N" (second example) |

-continued

Service Dependencies:

| Pre-defined String | Meaning/Replacement Text |
| --- | --- |
| BusinessAligned2 | Is the candidate service business aligned? "Y" or "N" (second example) |
| Composeable2 | Is the candidate service compose-able? "Y" or "N" (second example) |
| ExternalizedDescription2 | Does the candidate service have an externalized description? "Y" or "N" (second example) |
| ServiceExposureComment2 | Additional justification for exposure decision (second example) |

Service Dependencies:

| Pre-defined String | Meaning/Replacement Text |
| --- | --- |
| ServiceDependenciesIntroduction | Introductory text for the Service Dependencies section |
| ServiceDependency1 | Title for service dependency diagram (first example) |
| test.doc_images/SvcDeps.JPG | Diagram image of service dependency diagram (first example) |
| ServiceDependencyDescription1 | Description of service dependency diagram (first example) |
| ServiceDependency2 | Title for service dependency diagram (second example) |
| test.doc_images/OtherSvcDeps.JPG | Diagram image of service dependency diagram (second example) |
| ServiceDependencyDescription2 | Description of service dependency diagram (second example) |

Service Composition:

| Pre-defined String | Meaning/Replacement Text |
| --- | --- |
| ServiceCompositionIntroduction | Introductory text for the Service Composition section |
| ServiceComposition1 | Title for service composition diagram (first example) |
| test.doc_images/SvcComp.JPG | Diagram image of service composition diagram (first example) |
| ServiceCompositionDescription1 | Description of service composition diagram (first example) |
| ServiceComposition2 | Title for service composition diagram (second example) |
| test.doc_images/OtherSvcComp.JPG | Diagram image of service composition diagram (second example) |
| ServiceCompositionDescription2 | Description of service composition diagram (second example) |

Service Non-Functional Requirements (NFRs):

| Pre-defined String | Meaning/Replacement Text |
| --- | --- |
| ServiceNFRsIntroduction | Introductory text for the Service NFRs section |
| ServiceNFRService1 | Service name (first example) |
| NFRType1 | NFR type (first example) |
| NonFunctionalRequirement1 | NFR (first example) |
| ServiceNFRService2 | Service name (second example) |
| NFRType2 | NFR type (second example) |
| NonFunctionalRequirement2 | NFR (second example) |

Service Messages:

| Pre-defined String | Meaning/Replacement Text |
| --- | --- |
| ServiceMessagesIntroduction | Introductory text for the Service Messages section |
| ServiceInterfaceName | Service interface name |
| ServiceMessageService1 | Service operation name (first example) |
| MessageTopic1 | Service message topic (first example) |
| InputMessage1 | Input message (first example) |
| OutputMessage1 | Output message (first example) |
| ServiceMessageService2 | Service operation name (second example) |
| MessageTopic2 | Service message topic (second example) |
| InputMessage2 | Input message (second example) |
| OutputMessage2 | Output message (second example) |
| ServiceInterfaceEndMarker | Placeholder element to mark end of service interface section (should be of the same type as the markup that contains ServiceInterfaceName) |

In one or more embodiments of the invention, the AutoXSLT is an implementation code package. The AutoXSLT generates an output template for each input tag, and generates an XSLT transformation for each one. The assumptions can include, for example, that each element name uniquely generates one kind of output, and that dynamic content is provided by each attribute. An exemplary implementation and examples of AutoXSLT are captured in FIG. 22 through FIG. 30.

FIG. 22 is a diagram illustrating static structure and static contents, according to another aspect of the invention. FIG. 23 is a diagram illustrating static structure and dynamic contents, according to another aspect of the invention. FIG. 24A through FIG. 24C are diagrams illustrating dynamic structure and notion of nesting node, according to another aspect of the invention.

FIG. 25A through FIG. 25E are diagrams illustrating nested dynamic structure, according to another aspect of the invention. FIG. 26A through FIG. 26 F are diagrams illustrating sequential dynamic structure, according to another aspect of the invention. FIG. 27A through FIG. 27E are diagrams illustrating mixed dynamic structure, according to another aspect of the invention.

FIG. 28A through FIG. 28E are diagrams illustrating sequential dynamic structure, according to another aspect of the invention. FIG. 29 is a diagram illustrating non-contiguous structures, according to another aspect of the invention. Also, FIG. 30 is a diagram illustrating ambiguous structures, according to another aspect of the invention.

The unsupported patterns depicted, for example, in FIG. 28A through FIG. 28E, are identified and implemented for illustrating the power of one or more embodiments of the invention. A real-life example of using AutoXSLT is provided below.

AutoXSLT has been tested with success on the generation, for example, of Microsoft® Word word processor documents with the following properties: 100+ output pages; sophisticated, professional quality formatting, all contents other than formatting automatically generated (for example, 100+ generated tables, 100+ generated embedded figures, etc.), 8 megabit (Mb) output file in XML format (6 Mb after conversion to .doc), AutoXSLT processing time less than two seconds, and XSLT generation engine processing time less than two seconds. Additionally, document size is not a problem for AutoXSLT.

The input.xml file may itself be automatically generated by extracting "pure contents" from an existing representation. If that representation is an XML application, then XSLT may also be used to create the transformation.

AutoXSLT ignores any topology other than that of the XML hierarchy itself. In the case where references need to be set in the output document, an ad-hoc post-processing step might be required. The use of AutoXSLT is advantageous, for example, when topologies are simple and can be handled by a straightforward post-processing step. For example, WordML (and many other XML applications) allow embedding binary data within the XML document and to reference such data.

Also, WordML allows embedding image file data (converted to Base 64 so that the XML file is still readable by text editors) as

```
< w : binData w : name = "wordml : //06000001.jpg" >
H4sIAAAAAAACC2....
    < /w : binData >
``` and to also reference this data in

```
< v : imageData src = "wordml : //06000001.jpg" >
    ...
    < / v : imageData >.
```

If AutoXSLT is used to generate such WordML documents, then it is advantageous to process the generated document to actually add the appropriate image data from the right image file. AutoXSLT will consider the data in <w:binData> as static contents and will copy whatever data was in the example output.xml file. The MakeStandaloneWordML Java class was created for this purpose and is an example of a post-processing program that can be used in one or more embodiments of the present invention. Assuming that the image file "06000001.jpg" is actually on the local drive, MakeStandaloneWordML can update the output.xml file by inserting the contents of this file in Base64 in the appropriate <w:binData> entity.

MakeStandaloneWordML is advantageous when using AutoXSLT, for example, to generate WordML reports from RSA models. The RSA's report generation engine generates image files (in the JPEG format, for example) in a local temporary folder and the pre-processing step that converts the model file into the input.xml file can simply reference these image files using their file path.

At least one embodiment of the invention may provide one or more beneficial effects, such as, for example, avoiding the resource investment needed to create transformations that go from a particular representation to another representation.

It should be noted that the invention is not limited to the precise exemplary embodiments detailed above, and that various other changes and modifications may be made by one skilled in the art.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for automatically creating and using a transform to generate a document in a target format from a source document, comprising the steps of:
    obtaining a source document;
        wherein the source document is in a source structured format; and
        wherein the source document comprises structured information from a source domain-specific representation;
    creating a specially-tagged version of the source document including one or more tags comprising one or more unique identifiers representing each item of the structured information which is to appear in an output document;
    creating the output document in a target format with one or more tags corresponding to the one or more tags in the specially-tagged version of the source document; and
    applying an algorithm to automatically generate a transform by using a mapping of the structured information associated with said source document to a target domain-specific representation of said target format, wherein the mapping is automatically created, wherein applying the algorithm to automatically generate the transform comprises the steps of:
        identifying one or more corresponding structures in the source document and the output document using tag-based pattern matching; and
        analyzing the one or more corresponding structures, stripping variable content which appears in both the source document and the output document from both the source document and the output document, and marking locations of the variable content for replacement by other variable content in connection with a different instance of a source document to create the transform.

2. The method of claim 1, wherein a structured format comprises extensible markup language (XML).

3. The method of claim 1, wherein the transform comprises an extensible stylesheet language transformation (XSLT) document.

4. The method of claim 1, further comprising the step of using the source document to create an intermediate document, wherein the intermediate document comprises at least one of an extensible markup language (XML) metadata and one or more graphic components.

5. The method of claim 1, wherein the source document in a structured format comprises one or more elements that describe a message format exchanged between two or more web services.

6. The method of claim 1, wherein the source document in a structured format comprises one or more elements that describe a service that comprises a service-oriented architecture (SOA)-based solution.

7. The method of claim 1, wherein the source document in a structured format is extracted from a service-oriented architecture (SOA) solution modeling environment.

8. The method of claim 1, wherein the target format comprises one of hypertext markup language (HTML), rational software architect (RSA), content from a relational database (RDB) and portable document format (PDF).

9. The method of claim 1, further comprising the additional step of:
    automatically translating the version of the source document in the target format to a well-formatted document.

10. The method of claim 1, further comprising the additional step of:
    storing the created transform in a database.

11. A computer program product comprising a non-transitory computer useable readable recordable device having computer useable program code for automatically creating and using a transform to generate a document in a target format from a source document, said computer program product including:

computer useable program code for obtaining a source document;
 wherein the source document is in a source structured format; and
 wherein the source document comprises structured information from a source domain-specific representation;
computer useable program code for creating a specially-tagged version of the source document including one or more tags comprising one or more unique identifiers representing each item of the structured information which is to appear in an output document;
computer useable program code for creating the output document in a target format with one or more tags corresponding to the one or more tags in the specially-tagged version of the source document; and
computer useable program code for applying an algorithm to automatically generate a transform by using a mapping of the structured information associated with said source document to a target domain-specific representation of said target format, wherein the mapping is automatically created, wherein the computer useable program code for applying the algorithm to automatically generate the transform further comprises computer useable program code for:
identifying one or more corresponding structures in the source document and the output document using tag-based pattern matching; and
analyzing the one or more corresponding structures, stripping variable content which appears in both the source document and the output document from both the source document and the output document, and marking locations of the variable content for replacement by other variable content in connection with a different instance of a source document to create the transform.

12. The computer program product of claim 11, wherein the target format comprises one of hypertext markup language (HTML), rational software architect (RSA), content from a relational database (RDB) and portable document format (PDF).

13. An apparatus for automatically creating and using a transform to generate a document in a target format from a source document, comprising:

a memory; and
at least one processor coupled to said memory and operative to:
 obtain a source document;
  wherein the source document is in a source structured format; and
  wherein the source document comprises structured information from a source domain-specific representation;
 create a specially-tagged version of the source document including one or more tags comprising one or more unique identifiers representing each item of the structured information which is to appear in an output document;
 create the output document in a target format with one or more tags corresponding to the one or more tags in the specially-tagged version of the source document; and
 apply an algorithm to automatically generate a transform by using a mapping of the structured information associated with said source document to a target domain-specific representation of said target format, wherein the mapping is automatically created, wherein the at least one processor coupled to said memory and operative to apply an algorithm to automatically generate a transform is further operative to:
 identify one or more corresponding structures in the source document and the output document using tag-based pattern matching; and
 analyze the one or more corresponding structures, strip variable content which appears in both the source document and the output document from both the source document and the output document, and mark locations of the variable content for replacement by other variable content in connection with a different instance of a source document to create the transform.

14. The apparatus of claim 13, wherein the target format comprises one of hypertext markup language (HTML), rational software architect (RSA), content from a relational database (RDB) and portable document format (PDF).

* * * * *